(12) United States Patent
Zisimopoulos et al.

(10) Patent No.: US 9,848,307 B2
(45) Date of Patent: Dec. 19, 2017

(54) MESSAGING OVER A NETWORK

(75) Inventors: Haris Zisimopoulos, London (GB); Ricky Kaura, Uxbridge (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 194 days.

(21) Appl. No.: 14/009,943

(22) PCT Filed: Apr. 4, 2012

(86) PCT No.: PCT/KR2012/002508
§ 371 (c)(1),
(2), (4) Date: Dec. 20, 2013

(87) PCT Pub. No.: WO2012/138107
PCT Pub. Date: Oct. 11, 2012

(65) Prior Publication Data
US 2014/0128113 A1 May 8, 2014

(30) Foreign Application Priority Data
Apr. 4, 2011 (GB) .................................. 1105694.2

(51) Int. Cl.
*H04W 4/14* (2009.01)
*H04L 12/58* (2006.01)
(Continued)

(52) U.S. Cl.
CPC .............. *H04W 4/14* (2013.01); *H04L 51/38* (2013.01); *H04W 4/005* (2013.01); *H04L 51/08* (2013.01); *H04W 60/00* (2013.01)

(58) Field of Classification Search
CPC ......... H04W 4/12; H04W 4/14; H04W 4/005; H04W 60/00; H04W 68/005;
(Continued)

(56) References Cited

U.S. PATENT DOCUMENTS 6,259,925 B1 7/2001 Josse
2007/0223428 A1 9/2007 Patterson et al.
(Continued)

FOREIGN PATENT DOCUMENTS

EP 1 942 685 A1 7/2008
EP 2 056 557 A1 5/2009
(Continued)

OTHER PUBLICATIONS

3GPP, 3rd Generation Partnership Project; Technical Specification Group Services and System Aspects; Support of Short Message Service (SMS) over generic 3GPP Internet Protocol (IP) access; Stage 2 (Release 7), Mar. 1, 2007, p. 8, line 21-p. 11, line 5; figures 6.1, 6.3, 6.4, p. 15, line 1-line 2, XP007902563, 3GPP TS 23.204 V7.2.0 (Mar. 2007), Sophia Antipolis, France.
(Continued)

*Primary Examiner* — George Eng
*Assistant Examiner* — Umair Ahsan
(74) *Attorney, Agent, or Firm* — Jefferson IP Law, LLP

(57) ABSTRACT

In accordance with one aspect of the present invention, there is provided a method for providing a short messaging service for a device to enable communication of a short message over an Internet Protocol (IP) network, the device adapted to access a telecommunications system communicatively coupled to the IP network, the IP network comprising one or more network nodes, the method comprising: subscribing to an attachment notification, the attachment notification indicating that the device has attached to the telecommunications system and is contactable for communication, said subscribing being performed by a network element communicatively coupled between the device and the one or more network nodes; receiving, at the network element, the attachment notification when the device has attached to the telecommunications system, the attachment (Continued)

notification comprising identification information for the device; and registering the device with at least one of the one or more network nodes for communication of short messages over the IP network, said registering being performed by the network element based on at least some of the identification information received in the attachment notification.

20 Claims, 14 Drawing Sheets

(51) Int. Cl.
*H04W 4/00* (2009.01)
*H04W 60/00* (2009.01)

(58) Field of Classification Search
CPC ..... H04W 80/10; H04W 88/184; H04W 8/02; H04W 64/00; H04W 88/02; H04W 4/00; H04W 8/18; H04W 92/02; H04W 88/06; H04L 51/38; H04L 12/5895; H04L 51/08; H04L 65/1006; H04L 65/104; H04L 29/08756; H04L 29/08108
See application file for complete search history.

(56) References Cited

U.S. PATENT DOCUMENTS

| | | | |
|---|---|---|---|
| 2007/0298817 A1 | 12/2007 | Alfano et al. | |
| 2008/0299971 A1* | 12/2008 | Cai et al. | 455/435.1 |
| 2010/0233992 A1* | 9/2010 | Nooren | H04L 12/5855 |
| | | | 455/404.1 |
| 2010/0331023 A1* | 12/2010 | Cai et al. | 455/466 |
| 2011/0077005 A1* | 3/2011 | Bhatt et al. | 455/435.1 |
| 2011/0134843 A1* | 6/2011 | Noldus | H04W 60/005 |
| | | | 370/328 |
| 2011/0230212 A1* | 9/2011 | Cai | H04W 68/00 |
| | | | 455/466 |
| 2013/0155920 A1* | 6/2013 | Lim | H04W 4/12 |
| | | | 370/310 |

FOREIGN PATENT DOCUMENTS

| | | |
|---|---|---|
| KR | 10-2011-0030605 A | 3/2011 |
| WO | 2006/049435 A1 | 5/2006 |

OTHER PUBLICATIONS

3GPP, 3rd Generation Partnership Project; Technical Specification Group Services and System Aspects; System Improvements for Machine-Type Communications; (Release 11), Mar. 14, 2011, p. 9, line 28-line 29, XP050476301, 3GPP TR 23.888 V1.1.0 (Mar. 2011), F-06921 Sophia-Antipolis Cedex, France.

3GPP, 3rd Generation Partnership Project; Technical Specification Group Services and System Aspects; IMS Aspects of Architecture for Home NodeB; Stage 2 (Release 9), Mar. 22, 2010, pp. 1-83, XP050401982, figures 6.4.5.3-1, 3GPP TR 23.832 V1.0.0 (Mar. 2010), F-06921 Sophia-Antipolis Cedex, France.

K. S. K. Murthy, Nextgen Short Message Gateway architecture for supporting short message services across different IP connectivity access networks, IEEE International Conference on Internet Multimedia Services Architecture and Applications (IMSAA), published 2009, IEEE, pp. 1-6.

ZTE: "The Registration Expiration Time Setting for IMSC Server approach", 3GPP Draft; S2-080526, 3rd Generation Partnership Project (3GPP), Mobile Competence Centre; 650, Route Des Lucioles; F-06921 Sophia-Antipolis Cedex; France, vol. SA WG2, No. Marina del Rey; Jan. 9, 2008, XP050263001; Jan. 9, 2008.

* cited by examiner

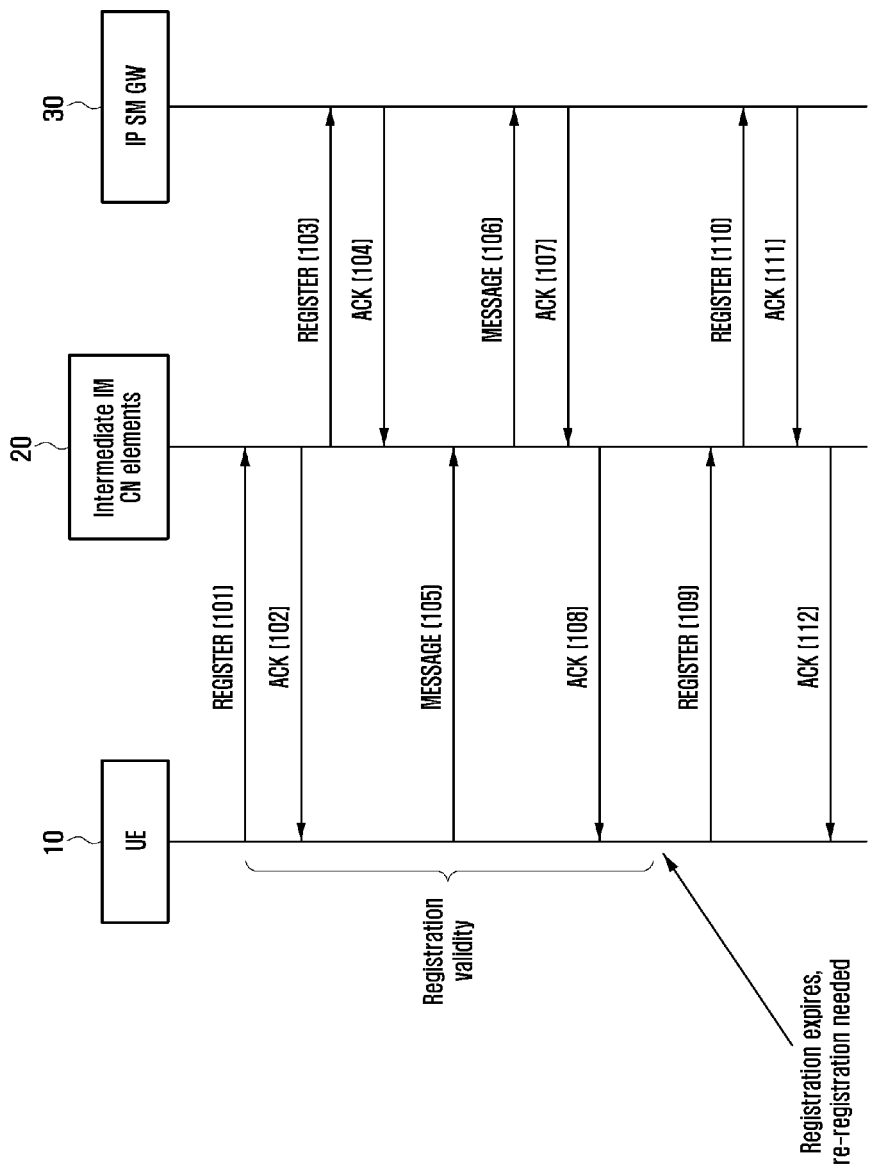

[Fig. 2]
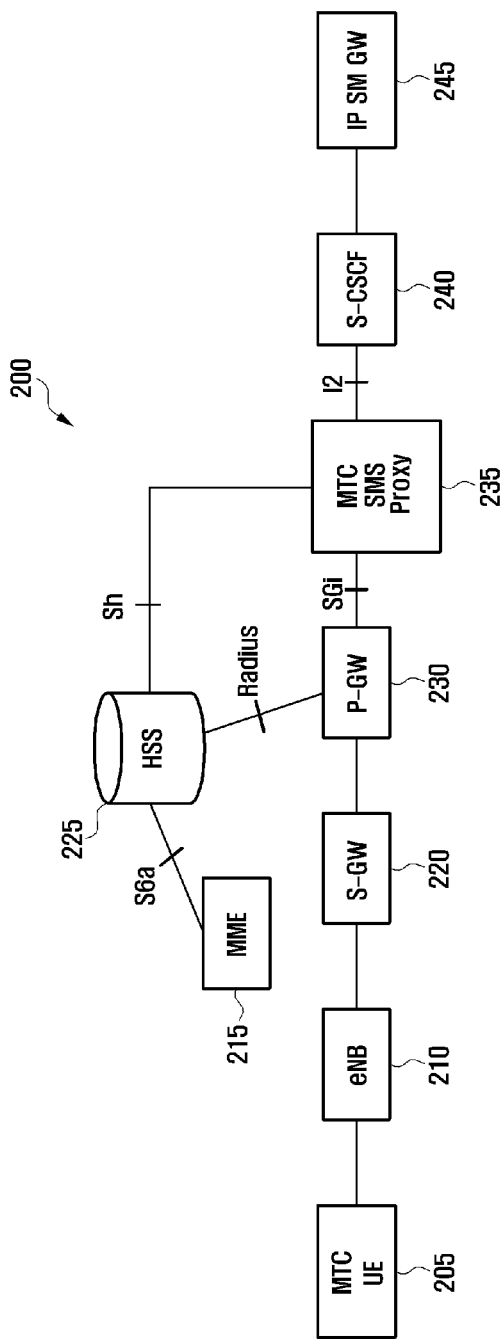

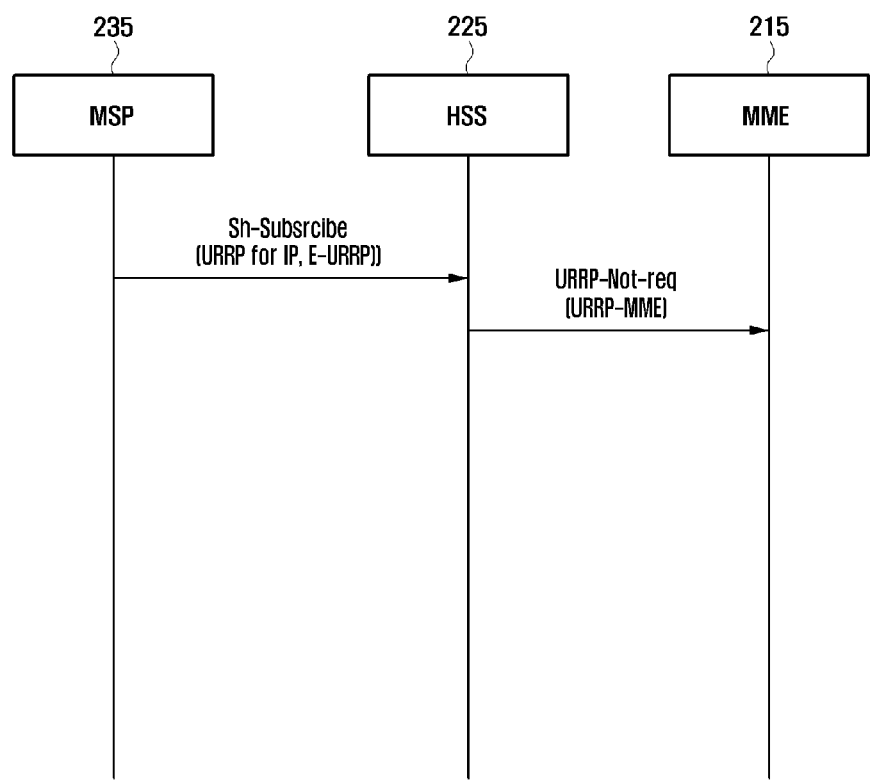
[Fig. 3]

[Fig. 4]
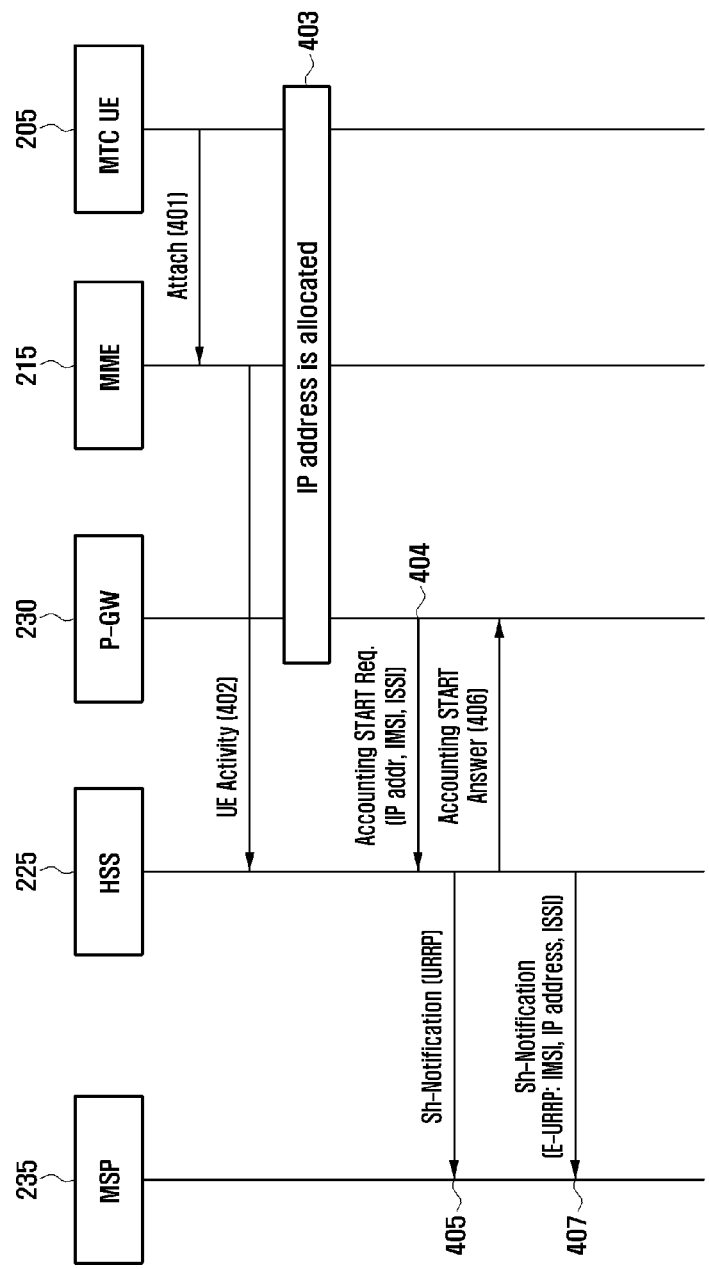

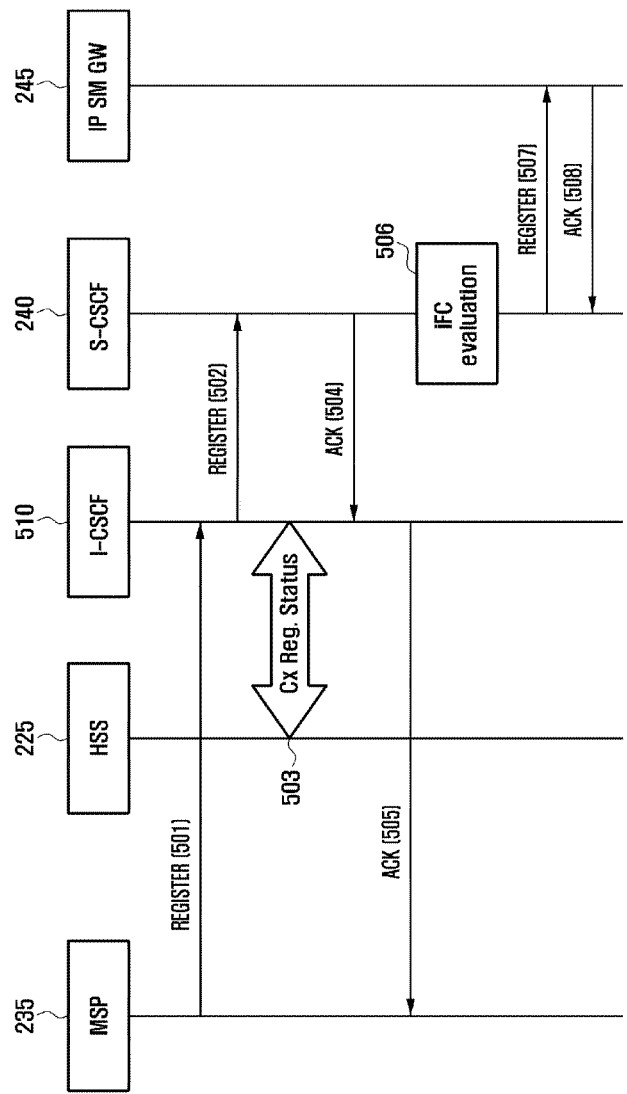
[Fig. 5]

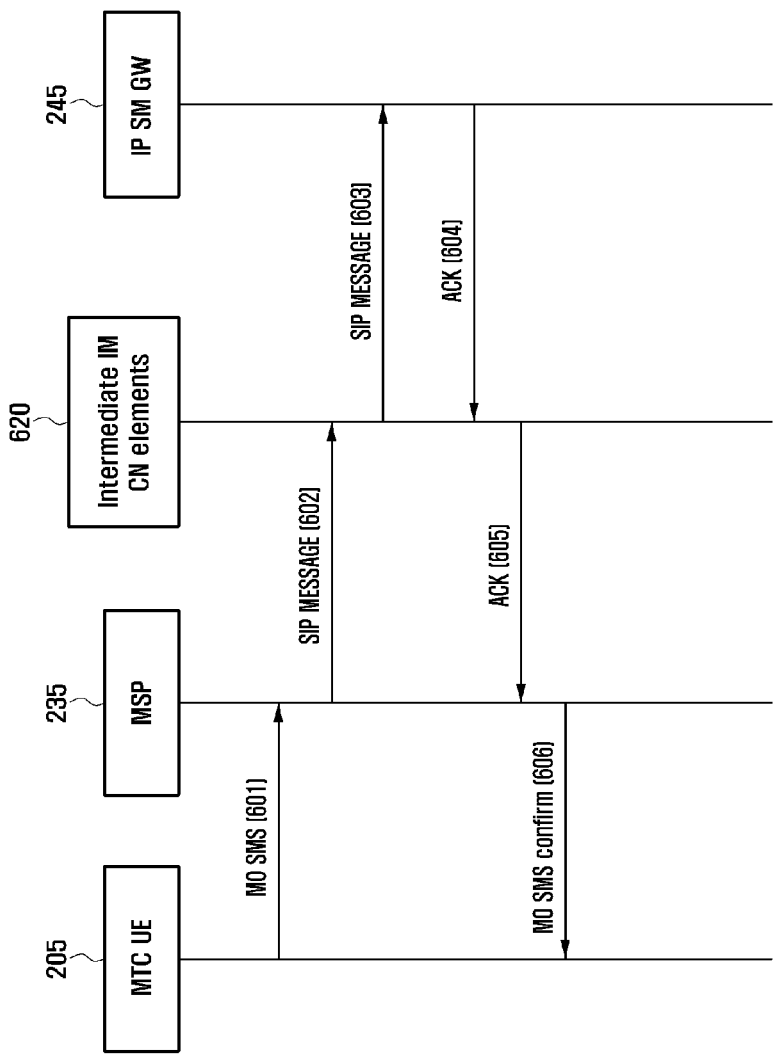
[Fig. 6]

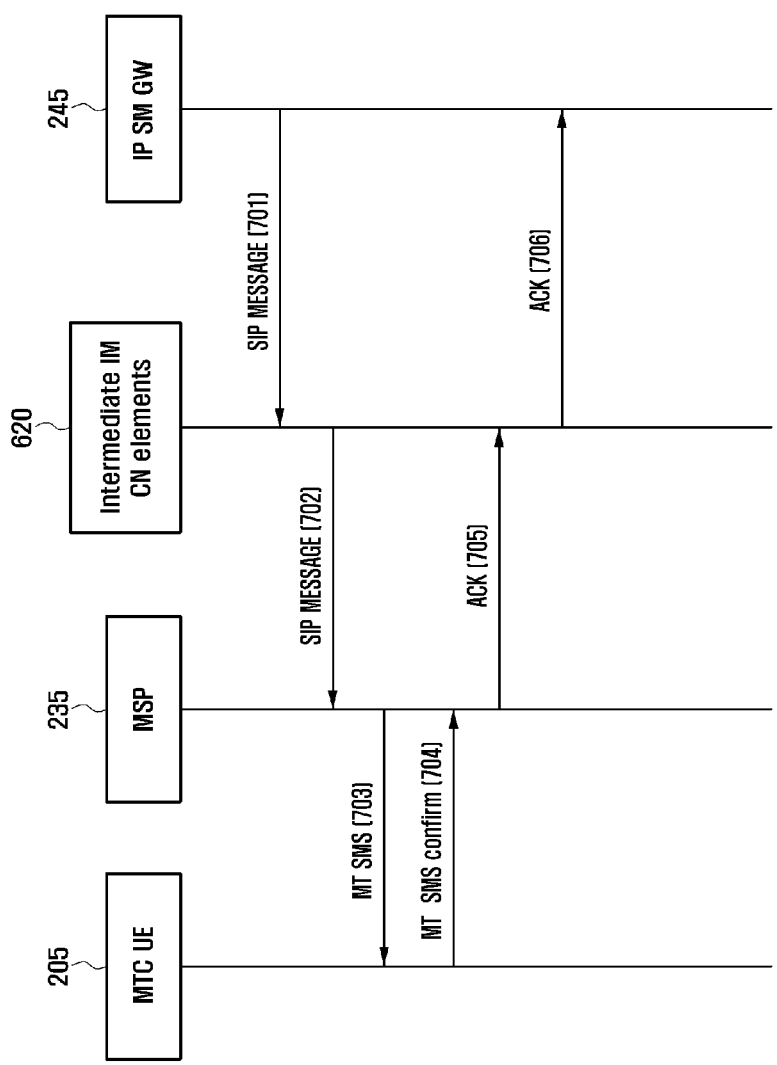
[Fig. 7]

[Fig. 8]
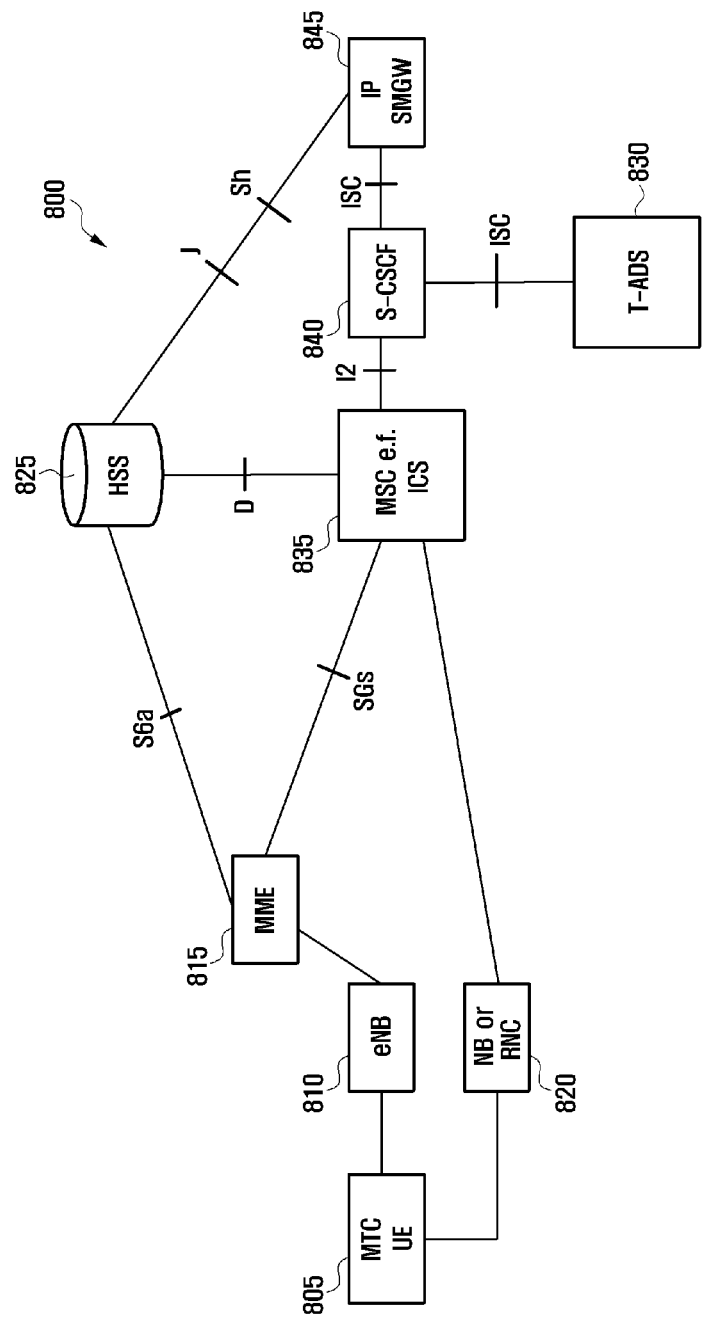

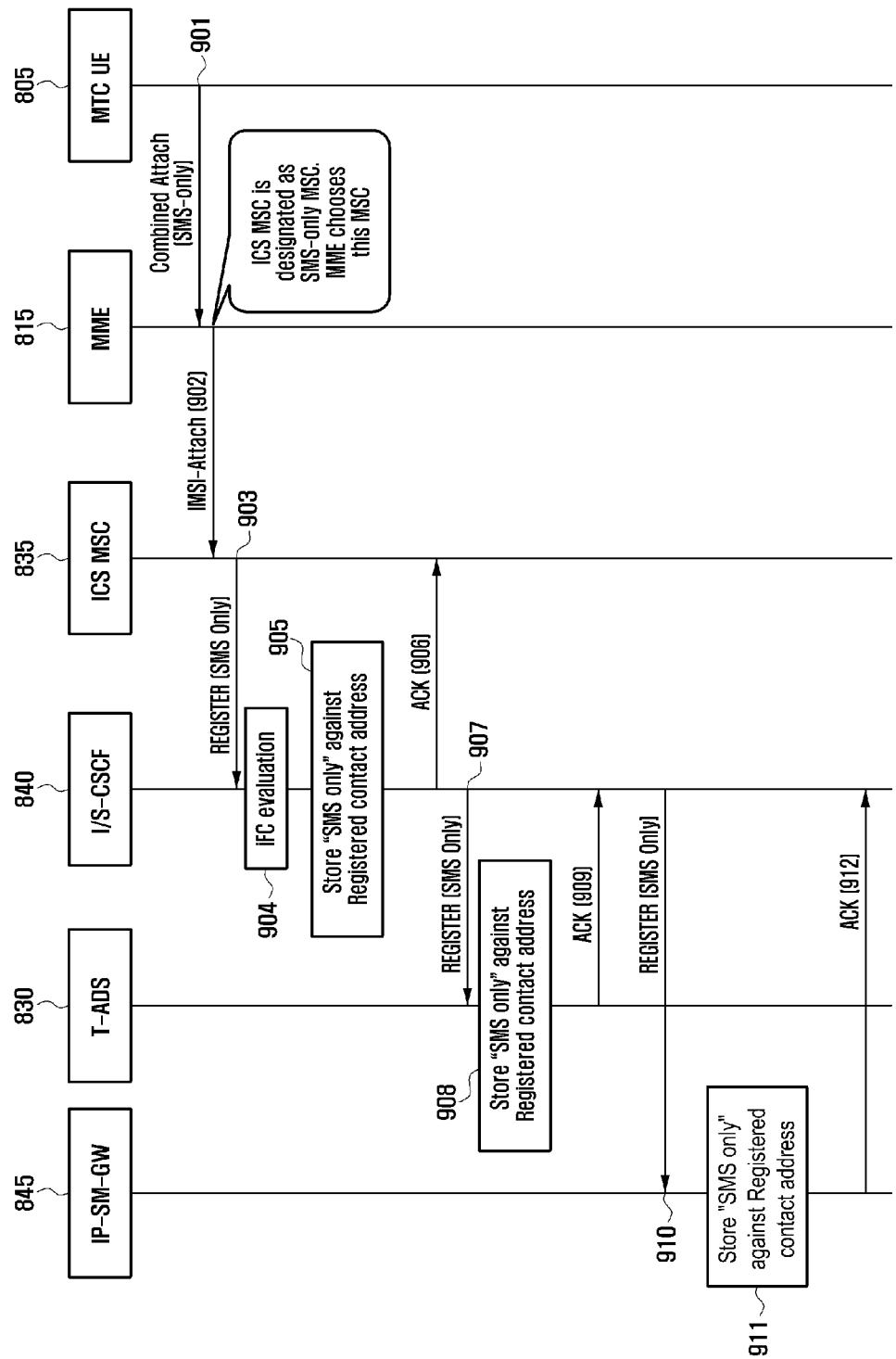
[Fig. 9]

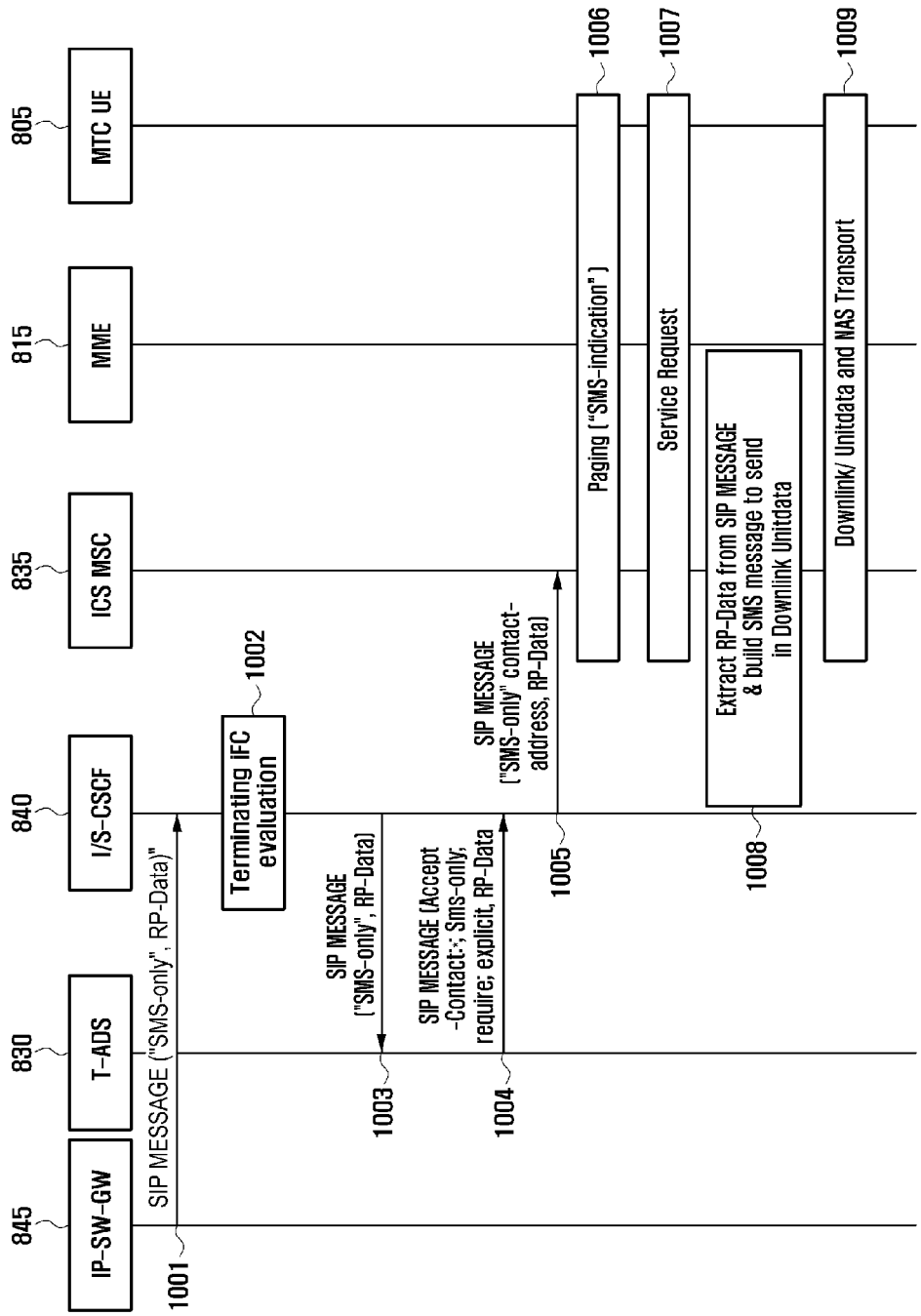
[Fig. 10]

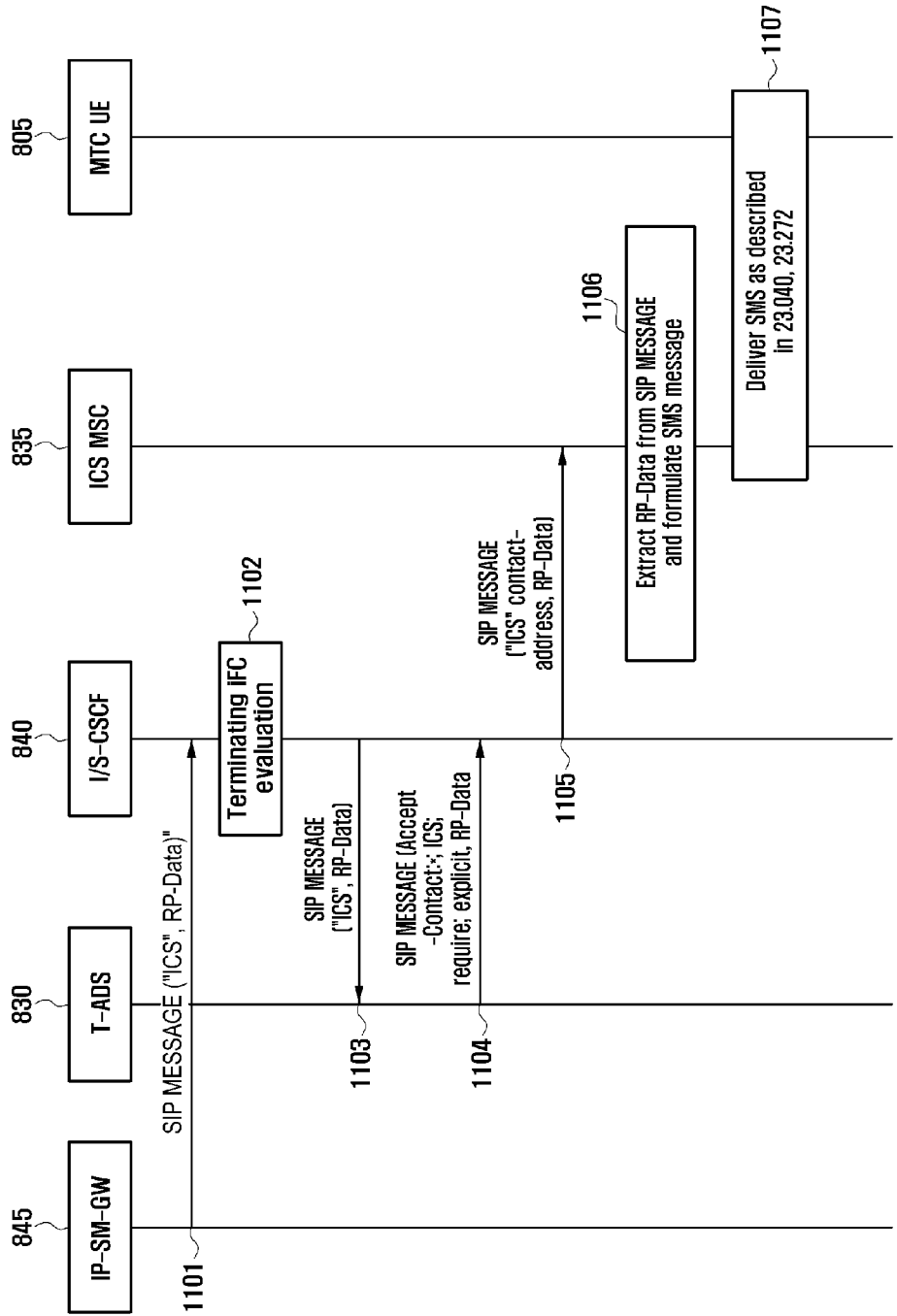
[Fig. 11]

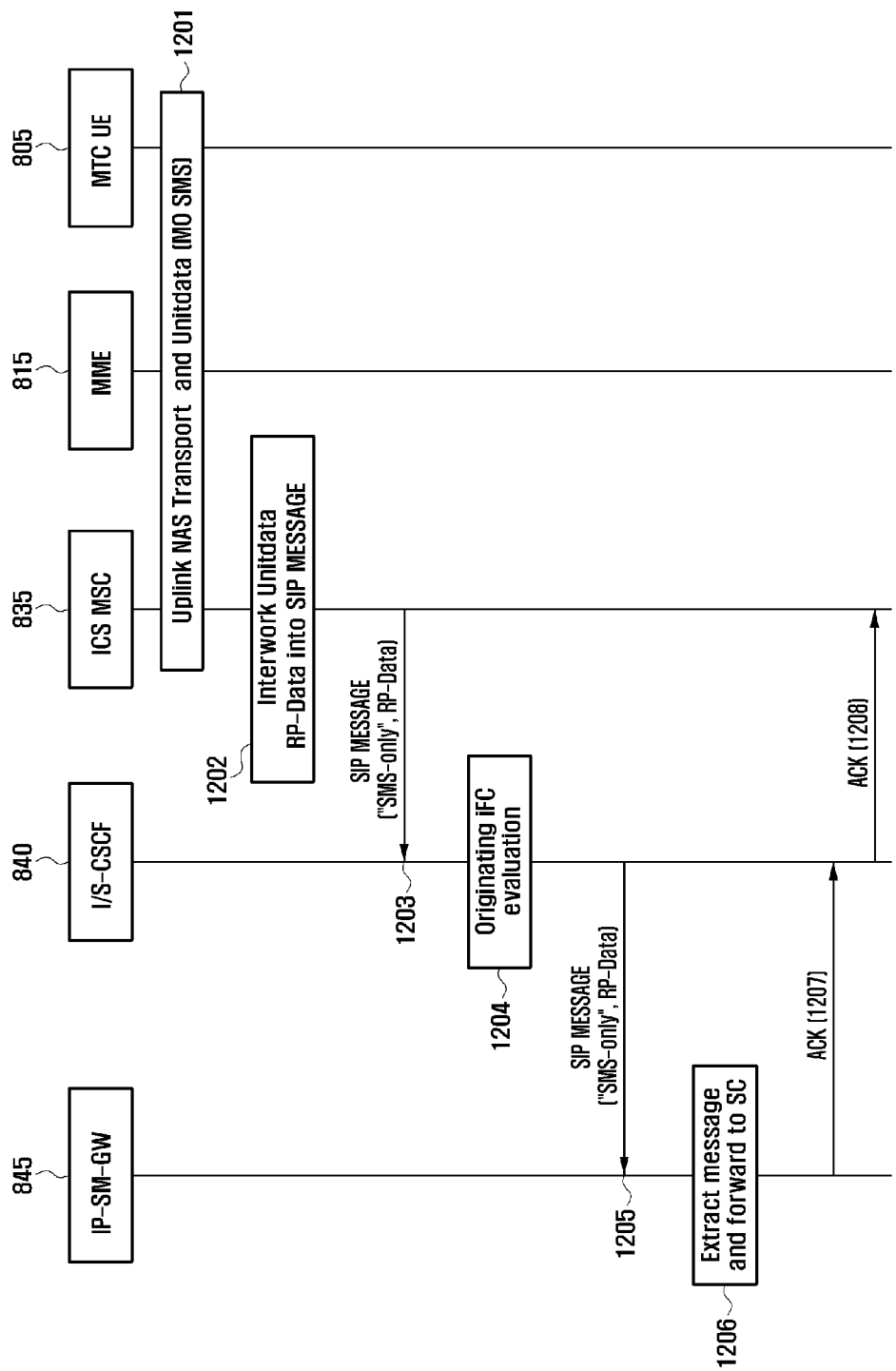
[Fig. 12]

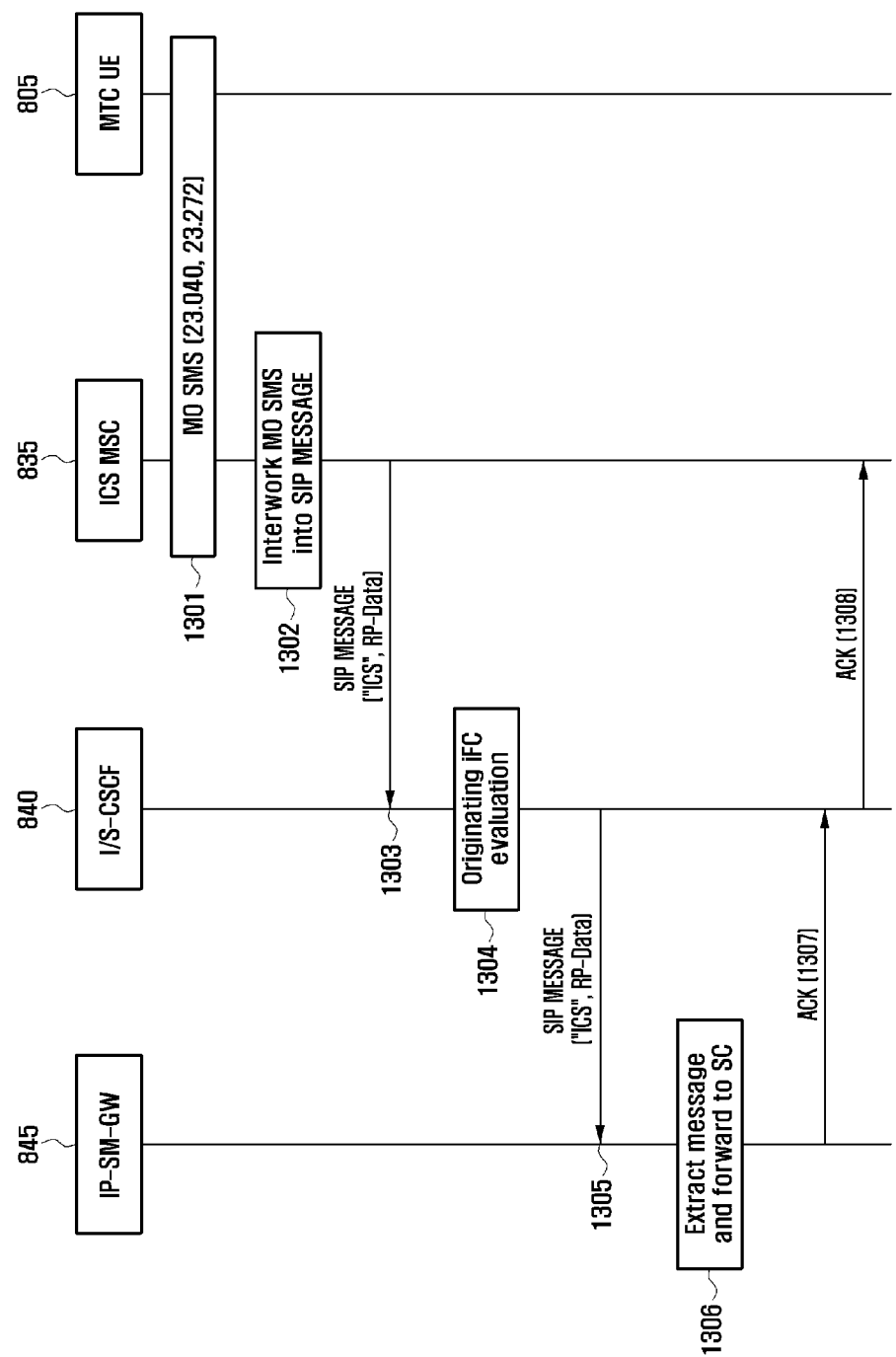
[Fig. 13]

[Fig. 14]

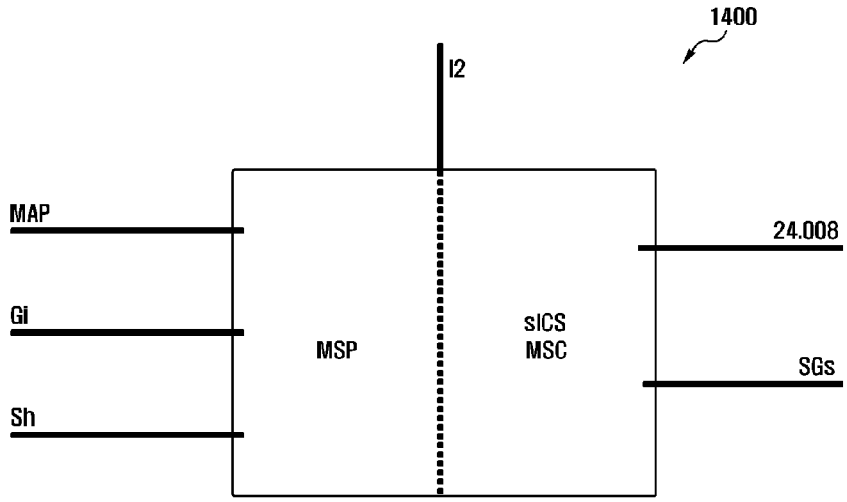

[Fig. 15]

```
1500
REGISTER sip : map.mnc015.mcc234 .3gppnetwork.org SIP /2.0
Via: SIP /2.0 /UDP [5555: :aaa:bbb:ccc:ddd] ;branch=z9hG4bKnashds7
Max-Forwards:70
P-Access-Network-Info: 3GPP-EUTRAN-TDD; eutran-cell-id-
3gpp=234151D0FCE11
P-Charging-Cector: icid-calue="Ayretyu0dm+602IrT5AFrbHLso=023551024"
Path: <sip:term@msp.home1.net;lr>
From: <sip:2341509999999999@msp.mnc015.mcc234.3gppnetwork.org>:tah=4fa3
To: <sip:2341509999999999@msp.mnc015.mcc234.3gppnetwork.org>
Contact :
   <sip: [5555: :aaa:bbb:ccc:ddd]>;expires=600000;+sip.instance="<urn:gsm
   a: imei904201565-025763-0>",+g.3gpp.icsi-ref="urn%Aurn-7%3gpp-
   service.ims.icsi.smsmtc";l+g.3gpp.smsmtc ="server"
Call-ID: apb03a0s09dkjdfglkj49111
Authorization: Digest username="
2341509999999999@msp.mnc015.mcc234.3gppnetwork.org", realm="
msp.mnc015.mcc234.3gppnetwork.org", nonce="", integrety-
protected="auth-done", url="sip:msp.mnc015.mcc234.3gppnetwork.org
", response=" "
CSeq: 1 REGISTER
Supported: gruu
Require:path
Content-Length: 0
```

1510 → From line
1520 → To line
1530 → Contact line

MESSAGING OVER A NETWORK

TECHNICAL FIELD

The present invention relates generally to the communication of messages over a network, and more specifically, to a method and apparatus for communicating a message from a device to a data network via a telecommunications system.

BACKGROUND ART

Messaging systems, such as the short messaging service (SMS), have been part of wireless communications systems for many years, providing a popular addition to voice telephony. Support for messaging systems on user equipment was introduced as part of the GSM (Global System for Mobile communications) standards. The wide use of such messaging systems by users mean that this support has continued as the technology for mobile telephony has developed, with GSM being replaced or augmented by third generation (3G) digital systems, which in turn are set to be replaced or augmented by the proposals of the Third Generation Partnership Project (3GPP) in the form of the Long Term Evolution (LTE) standards. LTE provides enhancements to the Universal Mobile Telecommunications System (UMTS) and offers a developmental base for the fourth generation (4G) LTE Advanced systems.

Newer technologies such as LTE may use an Internet Protocol (IP) based network architecture. This network architecture needs to support SMS messaging over an IP network as well as offer support for legacy SMS systems such as GSM. To do this an IP Short Message (IP SM) gateway is often provided. The IP SM gateway can receive SMS messages from SMS service centres (SMS-SCs) and also arrange delivery of SMS messages over an IP network. The IP SM gateway may be coupled to core architecture of the IP network. The use of an IP SM gateway introduces certain complexities into the network, which can lead to increased network traffic and transport overheads for both the network and attached devices.

As technology develops a further challenge is to provide support for a wide variety of user equipment and network operator implementations. User equipment comes in many different forms and may use a variety of communications standards to access wireless communications systems. This makes it difficult to provide an SMS that can support a wide range of user devices and protocols.

It is an object of the invention to provide optimised network messaging over a data network.

DISCLOSURE OF INVENTION

Technical Problem

One problem with the existing prior art registration procedure is that the registration expires. For example, the registration may only be valid for a particular time period after which re-registration is required. The process of re-registration was designed for, and works well with, mobile users. However, the process introduces a large traffic overhead as additional MTC devices use the telecommunications system. This overhead may overload the transport and/or IMS network. It is also problematic for MTC devices, for example those with limited battery power, such as sensor devices, wherein the re-registration requires communications that deplete the battery.

Solution to Problem

In accordance with one aspect of the present invention, there is provided a method for providing a short messaging service for a device to enable communication of a short message over an Internet Protocol (IP) network, the device adapted to access a telecommunications system communicatively coupled to the IP network, the IP network comprising one or more network nodes, the method comprising:
  subscribing to an attachment notification, the attachment notification indicating that the device has attached to the telecommunications system and is contactable for communication, said subscribing being performed by a network element communicatively coupled between the device and the one or more network nodes;
  receiving, at the network element, the attachment notification when the device has attached to the telecommunications system, the attachment notification comprising identification information for the device; and
  registering the device with at least one of the one or more network nodes for communication of short messages over the IP network, said registering being performed by the network element based on at least some of the identification information received in the attachment notification.

An advantage of using a network element to register on behalf on a device is that re-registration by the device with the IP network may be avoided. The burden for re-registration, if required, can be appropriated by the network element.

In an embodiment of the invention, the identification information comprises contact information for the device and the method further comprises:
  receiving, at the network element, short message data for delivery to the device;
  sending, from the network element, a short message for delivery to the device based on the contact information received in the attachment notification and the short message data.

The identification information may comprise both a unique identifier for the device and the contact information; the unique identifier possibly comprising one of an International Mobile Subscriber Identifier (IMSI) or an International Service-provider Subscription Identifier (ISSI) and the contact information possibly comprising an IP address.

It is advantageous to use or modify existing interfaces and/or protocols as this reduces the need for new hardware to provide the same functionality. This facilitates implementation of the network element.

In an embodiment of the invention, the short message data is configured according to a first network protocol and the short message is configured according to a second network protocol, the method further comprising generating the short message from the short message data, said generating being performed by the network element.

In an embodiment of the invention, the method further comprises:
  receiving, at the network element, a first message from the device, wherein the first message may be a mobile originating short messaging service message; and
  sending, from the network element, a second message to at least one of the one or more network nodes, wherein the second message is a session initiation protocol message.

In an embodiment of the invention, the step of subscribing comprises subscribing to an attachment notification issued by a home subscriber server. The attachment notification may be based on data received by the home subscriber server from a packet data network gateway following attachment of the device to the telecommunications network and the step of subscribing may comprise subscribing to User Equipment Reachability Request Parameter (URRP) for Internet Protocol (IP) Sh interface data using Diameter protocol, as set out in the LTE standards.

In an embodiment of the invention, the one or more network nodes comprise one or more of:

one or more session initiation protocol servers; and an Internet Protocol Short Message (IP SM) gateway arranged to send short messages to the device and/or receive short messages from the device, and the step of registering comprises registering with at least the IP SM gateway.

In an embodiment of the invention, the method further comprises re-registering the device with at least one of the one or more network nodes for communication of short messages over the IP network, said re-registering being performed by the network element following a specified period.

The telecommunications system may comprise a radio access network and the device wirelessly accesses the telecommunications system via the radio access network.

In accordance with a second aspect of the present invention, there is provided a network element for providing a short messaging service for a device to enable communication of a short message over an Internet Protocol (IP) network, the device adapted to wirelessly access a telecommunications system, the telecommunications system being communicatively coupled to the IP network, the IP network comprising one or more network nodes, the network element being communicatively couplable between the device and the one or more network nodes and arranged to:

subscribe to an attachment notification, the attachment notification indicating that the device that has attached to the telecommunications system and is contactable for communication;

receive the attachment notification when the device has attached to the telecommunications system, the attachment notification comprising identification information for the device; and register the device with at least one of the one or more network nodes for communication of short messages over the IP network based on at least some of the identification information received in the attachment notification.

The second aspect may comprise features equivalent to those set out with regard to embodiments of the first aspect above.

In accordance with a third aspect of the present invention, there is provided user equipment for use in a short messaging service, the user equipment adapted to access a telecommunications system for communication of a short message over an Internet Protocol (IP) network communicatively coupled to the telecommunications system, the IP network having a short message (SM) gateway, the user equipment being configured to address the short message to an network element communicatively coupled between the user equipment and the SM gateway.

An advantage of the third aspect is that user equipment may be configured to register with a network element that maintains a registration on behalf of the user equipment.

In an embodiment of the invention, the user equipment is configured to receive an address for the network element in a Non Access Stratum (NAS) message. This may use the Protocol Configuration Options (PCO) of an NAS message. Alternatively, the user equipment may be configured to receive an address for the network element in an Open Mobile Alliance Device Management (OMA-DM) message.

The address of the network element may be an IP address and the telecommunications system may comprise a radio access network. The user equipment may then be adapted to wirelessly access the telecommunications system via the radio access network.

In accordance with a fourth aspect of the present invention, there is provided a method for providing a short messaging service for a device to enable communication of a short message over an Internet Protocol (IP) network, the device adapted to access a telecommunications system communicatively coupled to the IP network, the IP network comprising one or more network nodes, the method comprising:

registering, using an network element communicatively coupled between the device and the one or more network nodes, the device with at least one of the one or more network nodes for communication of short messages over the IP network, said registering comprising associating a communication preference of the device with a contact address for the device, wherein, on receipt of a short message for communication between the device and the one or more network nodes, the communication preference is used to selectively invoke a terminating procedure of at least one of the one or more network nodes to route a short message to the device.

An advantage of the fourth aspect is that different types of user equipment may be supported by enabling the one or more network nodes to select a terminating procedure appropriate to a particular device based on a communication preference of the device.

In an embodiment of the invention, the method further comprises:

processing the short message for delivery according to the terminating procedure, said processing before performed by the network element.

In this case, the network element that registers on behalf of the device may also have a role in routing a message to the device.

In an embodiment of the invention, one of the one or more network nodes comprises an application server for terminating a communication with the device, for example a Terminating Access Domain Selection (T-ADS) server and wherein the selective invocation of a terminating procedure is performed following receipt of a short message at an Internet Protocol Short Message (IP SM) gateway.

In an embodiment of the invention, the step of registering may comprise:

registering a plurality of contact addresses for a device, each contact address having an associated communication preference of the device, and wherein the application server determines a contact address from the plurality of contact addresses for use in terminating the message.

This may be the case for a user equipment that is adapted to use multiple modes to access a telecommunications system, wherein the application server selects one of those modes to deliver a short message.

In an embodiment of the invention, the communication preference comprises a feature tag. The feature tag may indicate the registration is for a short messaging service only or for an enhanced Internet Protocol Multimedia Subsystem Centralised Service (ICS) providing SMS.

In an embodiment of the invention, the step of registering comprises sending a SIP registration request from the network element to indicate preferences for a short messaging service for the device.

In an embodiment of the invention, the telecommunications system comprises a radio access network and the device wirelessly accesses the telecommunications system via the radio access network.

In accordance with a fifth aspect of the present invention, there is provided a system for providing a short messaging service for a device to enable communication of a short message over an Internet Protocol (IP) network, the device adapted to access a telecommunications system communicatively coupled to the IP network, the system comprising:

a network element communicatively coupled to one or more network nodes of the IP network and the telecommunications system, wherein the network element is arranged to register the device with at least one of the one or more network nodes for communication of short messages over the IP network, said registration comprising associating a communication preference of the device with a contact address for the device, the communication preference being used to selectively invoke a terminating procedure of the one or more network nodes to route a short message to the device.

In an embodiment of the invention, the network element may be further arranged to process the short message for delivery according to the terminating procedure. The one or more network nodes may comprise an application server for terminating a communication with the device and an IP short message (IP SM) gateway. The network element may comprise an enhanced mobile switching centre (MSC), wherein the enhanced MSC may be adapted to send a SIP registration request indicating preferences for a short messaging service for the device and/or selectively interwork the short message according to the terminating procedure.

In an embodiment of the invention, the system further comprises:

one or more intermediate session initiation protocol (SIP) proxies;

wherein the network element is arranged to register the device using a session initiation protocol (SIP) registration and send the SIP registration towards the intermediate SIP proxies, the intermediate SIP proxies being arranged to forward the registration to one or more of the application server and the IP SM gateway, the terminating procedure comprising routing the short message to the device via the intermediate SIP proxies and the enhanced MSC.

In an embodiment, the communication preference comprises a feature tag, the feature tag indicating the registration is for a short messaging service only or for an enhanced Internet Protocol Multimedia Subsystem Centralised Service (ICS) providing a short messaging service.

The telecommunications system may comprise a radio access network and the device wirelessly accesses the telecommunications system via the radio access network.

In accordance with a sixth aspect of the present invention, there is provided, a network element for providing a short messaging service for a device to enable communication of a short message over an Internet Protocol (IP) network, the device adapted to wirelessly access a telecommunications system, the telecommunications system being communicatively coupled to the IP network, the IP network comprising one or more network nodes, the network element being communicatively couplable between the device and the one or more network nodes and arranged to:

subscribe to an attachment notification, the attachment notification indicating that the device that has attached to the telecommunications system and is contactable for communication;

receive the attachment notification when the device has attached to the telecommunications system, the attachment notification comprising a contact address; and register the device with at least one of the one or more network nodes for communication of short messages over the IP network, said registration comprising associating a communication preference of the device with the contact address for the device, the communication preference being used to selectively invoke a terminating procedure of the one or more network nodes to route a short message to the device, the network element being further arranged to process the short message for delivery according to the terminating procedure.

This aspect provides, in one apparatus, the functionality of the second and fifth aspects of the invention. The variations of the second and fifth aspects set out above may also be used with the sixth aspect.

Advantageous Effects of Invention

An advantage of using a network element to register on behalf on a device is that re-registration by the device with the IP network may be avoided. The burden for re-registration, if required, can be appropriated by the network element.

It is advantageous to use or modify existing interfaces and/or protocols as this reduces the need for new hardware to provide the same functionality. This facilitates implementation of the network element.

An advantage of the third aspect is that user equipment may be configured to register with a network element that maintains a registration on behalf of the user equipment.

An advantage of the fourth aspect is that different types of user equipment may be supported by enabling the one or more network nodes to select a terminating procedure appropriate to a particular device based on a communication preference of the device.

Further features and advantages of the invention will become apparent from the following description of preferred embodiments of the invention, given by way of example only, which is made with reference to the accompanying drawings.

BRIEF DESCRIPTION OF DRAWINGS

FIG. 1 shows an exemplary prior art method of registering a user equipment with a short message gateway;

FIG. 2 shows a first exemplary network system according to an embodiment of the present invention;

FIG. 3 shows an exemplary subscription method for a network element according to an embodiment of the present invention;

FIG. 4 shows an exemplary notification method for a network element according to an embodiment of the present invention;

FIG. 5 shows an exemplary registration method for an intermediate network element according to an embodiment of the present invention;

FIG. 6 shows a first exemplary method of sending a message originating from a user equipment device;

FIG. 7 shows a first exemplary method of receiving a message originating from a short message gateway;

FIG. 8 shows a second exemplary network system according to an embodiment of the present invention;

FIG. 9 shows an exemplary registration method for use in the second exemplary network system;

FIG. 10 shows a second exemplary method of receiving a message originating from a short message gateway;

FIG. 11 shows a third exemplary method of receiving a message originating from a short message gateway;

FIG. 12 shows a second exemplary method of sending a message originating from a user equipment device;

FIG. 13 shows a third exemplary method of sending a message originating from a user equipment device;

FIG. 14 shows an exemplary apparatus according to an embodiment of the present invention;

FIG. 15 shows an exemplary registration request.

MODE FOR THE INVENTION

With the growth of wireless communications technology, and the reduction in the cost of hardware components, the range of user equipment that can communicate over telecommunications systems is rapidly increasing. For example, in addition to standard mobile handsets for human users, hardware devices may use integrated or coupled electronics to communicate data, referred to herein as machine type communication (MTC), using telecommunications subsystems typically designed for voice communication. These hardware devices can be, amongst others, sensors, fixed computing devices, control systems, vehicles, personal or portable devices, computer game systems, electricity distribution systems, meters and measurement devices, domestic devices, healthcare devices, and industrial machinery. These devices may need to send and/or receive data for, amongst others, reporting, triggering, or control purposes. As the number of possibly-connected physical devices greatly outnumbers the number of possible human users (e.g. by an order of 10:1, 100:1 or higher) this provides significant challenges for telecommunications system providers. In particular, telecommunications infrastructure has been developed based around providing voice telephony for mobile users, which makes adapting such system for machine type communication difficult. This can be contrasted with the development of wired computer networks, such as the Internet, which have an infrastructure based on fixed lines, such as fibre optic cables, and fixed networked devices.

Given the possibilities of machine type communication, one surprising development is the use of short messaging service (SMS) to transfer data to and from MTC devices. Rather than design and develop new data protocols, existing SMS capabilities can be employed. For example, a sensor on a building adapted to communicate over a telecommunications network may use SMS messages to periodically send data to a computing substation that collates the data. However, as SMS has traditionally been designed for user messaging using mobile handsets, the infrastructure and/or protocols are not optimised for machine type communication.

A further challenge is the amount of data that is sent over the existing infrastructure. User-based voice and SMS traffic is limited by the physical capabilities of a human user; these limitations do not apply to machine type communication. In particular, due to the large number of devices and the high volume of data traffic, optimizations are required in the handling of registrations, such as those used in an Internet Protocol Multimedia Subsystem (IMS), to avoid overloading transport and/or IMS networks. A "lightweight" SMS solution is required that optimises performance, especially over the air.

FIG. 1 illustrates an exemplary prior art registration procedure for a user equipment (UE) 10 in a telecommunications system, such as an IMS, comprising intermediate Internet Protocol (IP) Multimedia (IM) Core Network (CN) elements 20 and an IP Short Message (SM) gateway 30. At step 101 the UE sends a registration request to the intermediate IM CN elements 20. At step 102, the intermediate IM CN elements 20 acknowledge the registration, typically using a Session Initiation Protocol (SIP) response status code of "200 OK" that is sent to the UE 10. At step 103, the intermediate IM CN elements 20 forward the registration to the IP SM gateway 30, which at step 104 acknowledges the registration. Once registered, a UE can send an SMS message. At steps 105 and 106 an SMS message is sent by the UE 10 to the IP SM gateway 30 via the intermediate IM CN elements 20. The intermediate IM CN elements 20 provide a path for the SMS message to the IP SM gateway 30. At step 107 the IP SM gateway provides an acknowledgement, in a similar manner to step 104, which is sent to the UE 10 via the intermediate IM CN elements 20 at step 108.

One problem with the existing registration procedure of steps 101 to 108 is that the registration expires. For example, the registration may only be valid for a particular time period after which re-registration is required, as illustrated by steps 109 to 112. In steps 109 and 110 a new registration request is sent by the UE 10 via the intermediate IM CN elements 20 to IP SM gateway 30. At steps 111 and 112 an acknowledgement is returned from the IP SM gateway to the UE 10. The process of re-registration was designed for, and works well with, mobile users. However, the process introduces a large traffic overhead as additional MTC devices use the telecommunications system. This overhead may overload the transport and/or IMS network. It is also problematic for MTC devices, for example those with limited battery power, such as sensor devices, wherein the re-registration requires communications that deplete the battery.

The present invention provides embodiments that optimise SMS communications over IP (SMSoIP). These embodiments introduce a network element that registers on behalf of a UE. The network element may also be used to efficiently route messages to and from a UE, such a range of UE and a range of access mechanisms can be accommodated.

A first exemplary network system 200 for use with a first embodiment is shown in FIG. 2. The network system is described with relation to the LTE wireless communication standard for ease of example; however, the present invention is not limited to this standard, such that functionally equivalent network elements from other telecommunications systems may be alternatively used, whether they be wired or wireless. Additionally, a telecommunications or network system may comprise more or fewer elements and more or fewer communication interfaces than those shown in FIG. 2; FIG. 2 may be seen as illustrating the telecommunications or network elements and interfaces that aid explanation of the present embodiment.

FIG. 2 shows a MTC UE 205 adapted to communicate with a telecommunications system. A MTC UE 205 is used for example only; any device adapted to communicate messages over a network, such as regular UE, mobile handsets, so-called dongles, etc. may be used. In this example, MTC UE 205 wirelessly accesses the telecommunications network using a wireless base station, for example those referred to in the LTE standards as an eNobeB (eNB).

The MTC UE 205 may be adapted to utilise the over-the-air transmission standards set out in LTE or any other form of wireless access mechanism. In other embodiments an alternate wired access mechanism may be used. The eNodeB 210 is communicatively coupled to a Mobile Management Entity (MME) 215. The term communicatively coupled is used herein to refer to any coupling of two entities such that they can communicate; coupling may be implemented by wired or wireless communication channels and may be direct or may use intermediate elements. The MME 215 is an entity with a responsibility to control how a UE accesses the telecommunication network, including, for example, UE tracking, paging, transmission configuration, the application of roaming restrictions, and addressing for the UE. The MME 215 and the eNB 210 are communicatively coupled to a serving gateway (S-GW) 220. The serving gateway 220 routes and forwards data received from a UE via an eNodeB. It acts as a constant component whereas the eNobeB 210 may vary as the physical location of the MTC US 205 varies. The MME 215 is also communicatively coupled, via an interface referred to in LTE as S6a, to Home Subscriber Server (HSS) 225. HSS 225 performs functions required for authentication and authorization of a user associated with the MTC UE 205. If the MTC UE 205 comprises a device that does not have an identifiable user, the user may be an entity or enterprise responsible for the MTC UE 205. The HSS 225 may also supply user or subscriber profiles and location information. The HSS 225 is communicatively coupled to a Packet Data Network (PDN) gateway (P-GW) 230 via an interface referred to in LTE as Radius. The PDN gateway 230 is adapted to connect the MTC UE 205 to packet data networks. It may also provide packet-related functionality such as filtering, charging or policy enforcement. Under the LTE standard, the MME 215, and serving gateway 220, PDN gateway 230 may be referred to as an Evolved Packet Core (EPC).

The exemplary network system 200 further comprises an Internet Protocol (IP) Short Message (SM) gateway (IP SM GW) 245. The IP SM gateway 245 acts as a gateway to an IP network, which may comprise an IMS under the LTE standard. The IP network may comprise one or more network nodes, inclusive of the IP SM gateway 245. In the present example, one or more Session Initiation Protocol (SIP) proxies may also form part of the IP network of the IMS; an SIP proxy in the form of a Serving Call Session Control Function (S-CSCF) server 240 is shown in FIG. 2, although other proxies such as an Interrogating Call Session Control Function (I-CSCF) server (not shown in FIG. 2) may also be provided. SIP is used as a signalling protocol on the IP network that forms the IMS as it is suitable for use in transporting voice calls over the network. In other embodiments, alternative protocols could also be used. The S-CSCF server 240 provides signalling and session control functions and performs message forwarding.

According to a first embodiment of the present invention a new network element is provided in the form of a Machine type communication (MTC) Short message service (SMS) Proxy (MSP) 235. This element provides proxy and/or gateway functionality that is optimised for machine type communication, although its use is not limited to machine type communication, for example it may be used with for other forms of UE communication. In the present example, the MSP 235 is communicatively coupled between the one or more network nodes 240 and 245 and the MTC UE 205. The MSP 235 is further communicatively coupled to the telecommunications system in the form of at least eNB 210 and MME 215 via the PDN gateway 230, HSS 225 and serving gateway 220. The MSP 235 in FIG. 2 is communicatively coupled to the S-CSCF server 240 by an interfaced defined in the LTE as I2; to the HSS 225 by an interfaced defined in the LTE as Sh; and to the PDN gateway 230 by an interfaced defined in the LTE as SGi. These interfaces are presented for example only and may differ for other forms of network.

The MSP 235 handles registration, for example IMS registration, including re-registration, on behalf on a UE, for example the MTC UE 205. This avoids the need for the UE to re-register with the IP network for the communication of SMS messages. The MSP 235 routes UE originating (referred to as mobile originating or MO) and UE terminating (referred to as mobile terminating or MT) messages from and to the MTC UE 205.

The MSP 235 is utilised in an exemplary four phase procedure for providing an SMS to MTC UE 205. Four phases are used to describe an embodiment but the present invention may use more or fewer phases. The exemplary method described below also need not be used solely in association with the exemplary network arrangement of FIG. 2 although reference to MSP 235 is made for ease of explanation. The first phase provides for subscription to an attachment notification; the second phase provides for notification to the MSP; the third phase provides for registration by the MSP on behalf of the MTC UE; and the fourth phase provides for sending and receiving an SMS message.

FIG. 3 shows an exemplary subscription method for the MSP 235 according to an embodiment of the present invention. In this phase, the MSP 235 subscribes to a notification that a UE, such as MTC UE 205, is reachable. This notification may indicate that MTC UE 205 has attached to the telecommunications system shown in FIG. 2, for example, through eNB 210. The exemplary method of FIG. 3 makes use of an existing UE Reachability Request Parameter (URRP) for the IP network (URRP for IP). Subscription to this parameter is defined as part of the Sh interface. The exemplary method of FIG. 3 further defines a new notification, an extended URRP (E-URRP) that may be added to the Sh interface. This new notification (E-URRP) has the function of providing identification information for the device when the device attaches to the telecommunications system. The identification information may comprise a unique identifier for the device and a contact address. Although the present example uses two separate notifications, they may be combined into a single notification.

In FIG. 3, step 301 illustrates a subscription request for the URRP for IP and E-URRP that is sent using the Sh interface from the MSP 235 to the HSS 225. In the present example the HSS 225 provides notification of attachment and so the subscription request is sent to the HSS, however, if the notification of attachment is to be supplied by a different entity the subscription request may be adapted accordingly.

Following subscription request 301, the HSS 225 stores the identity of MSP 235. The HSS 225 may also set a URRP parameter for the MME 215 (URRP-MME) to indicate that such request is received. For example, if the value of URRP-MME parameter has changed from "not set" to "set", the HSS sends a URRP-MME to the MME 215 as shown in step 302. If the MME manages a user or entity associated with the MTC UE 205, i.e. has a mobile management context, the MME 215 sets its URRP-MME parameter to indicate the need to report to the HSS 225 information regarding changes in UE reachability, e.g. when the next non access stratum (NAS) activity with that UE is detected. Step 302 enables the HSS 225 to be notified by the appropriate subsystem components of when the MTC UE 205 accesses the telecommunication system so that it can, in turn, notify the MSP 235. Step 302 may vary for different networks and different implementations, for example, for a General Packet Radio Service (GPRS) system, a Serving GPRS Support Node (SGSN) URRP (URRP-SGSN) parameter may be used. By making use of existing procedures the method of the embodiments reduces the need to modify existing subsystems and supply new hardware.

FIG. 4 shows an exemplary notification method according to the first embodiment. This method notifies the MSP 235 when an MTC UE 205 accesses the telecommunications system. It further provides identification information that enables the MSP 235 to register on behalf of the MTC UE 205 and, in certain embodiments, act as a proxy for messages to and from the MTC UE 205.

Turning to FIG. 4, at step 401 the MTC UE 205 attaches to the telecommunications system. To do this the MTC UE 205 may wirelessly access the telecommunications system via eNB 210 under control of the MME 215. MME 215, following attachment of the device, is configured, for example based on the URRP-MME parameter, to inform the HSS 225 of UE activity at step 402, for example using the S6a interface. As part of the attachment process the MTC UE 205 is allocated a contact address at step 403. In this example, this is an IP address that is allocated using a known attachment procedure that involves MTC US 205, MME 215, and PDN gateway 230. The allocation of a contact address, which forms the basis for the contact information for the MTC UE 205, may occur before, after or contemporaneously with step 402. At step 404 the HSS 225 is informed of the contact address. In the present example, the PDN gateway 230 informs the HSS 225 of the IP (contact) address, as well as the International Mobile Subscriber Identifier (IMSI) and the International Service provider Subscription Identifier (ISSI), a new identifier for MTC devices, which can be collectively referred to as identification information. In the present example, an "accounting START" request, as defined as part of the Radius interface, is used to communicate the identification information to the HSS 225 at step 404. In alternate embodiments other methods of supplying identification information may be used. At step 405 an attachment notification is sent from the HSS 225 to the MSP 235. This follows the subscription to the notification by the MSP 235. In the present example, the Sh interface is used to provide an URRP notification, which indicates attachment of the MTC US 205 to the telecommunications system. Following either of steps 404 or 405, the HSS 225 may also send a reply, an "accounting START answer" back to the PDN gateway 230. At step 407, the HSS 225 also sends an E-URRP notification to the MSP 235 that, in this example, contains the IMSI, the IP address and the ISSI of the MTC UE 205. In practice, steps 405 and 407 may be combined to provide a single notification, which would require the HSS at step 402 to wait for the message 404. The notification also need not originate with the HSS 225; any device with access to notification of MTC UE 205 joining the telecommunications system and/or access to identification information for the device may provide data to the MSP 235.

FIG. 5 illustrates an exemplary registration procedure performed by the MSP 235 on behalf of the MTC UE 205. MSP 235 registers MTC UE 205 for use in communicating messages such as SMS messages over the network 200. MSP 235 may use registration procedures defined in the I2 interface specification. At step 501, a registration request is sent to one or more network nodes that form the IP network.

In the present example, the registration request is sent to I-CSCF server 510, which appropriately forwards the request to the S-CSCF server 240. At step 503 a confirmation of the registration status may be exchanged between the HSS 225 and the I-CSCF server 510. At step 504, an acknowledgement, such as a "200 OK" SIP response, may be sent from the S-SCSF server 240 to the I-CSCF server 510. This may then result in an acknowledgement that is sent from the I-CSCF server 505 to the MSP 235 to acknowledge the registration. At step 506 the registration request may result in an initial Filter Criteria (iFC) evaluation wherein the S-CSCF server 240 applies filter criteria to the registration request received via the I-CSCF server 510. In the present case, the application of the iFC evaluation results in the S-CSCF server 240 forwarding the registration request to the IP SM gateway 245 at step 507, which may be acknowledged at step 508. In all signalling procedures, the MSP 235 may assume trusted node authentication, i.e. be trusted by the other network nodes and thus avoid the requirement for additional authorization. Hence, in the exemplary method of FIG. 5 the MSP 235 registers on behalf of the MTC UE 205 with at least the IP SM gateway 245. The registration procedure may, in some implementations, follow those described with regard to the second embodiment below.

FIG. 15 shows an exemplary registration request 1500. In this example, the registration request takes the form of a Session Initiation Protocol (SIP) request. The purpose of the request 1500 is to register a private user identity and a temporary public user identity derived from the subscriber's IMSI on behalf of a user or owner of the MTC UE 205 with the S-CSCF server 240 in a home network, the home network being the default or resident network for the MTC UE 205. The IMSI may be derived from the attachment notification of step 407. This request is routed from the MSP 235 to the I-CSCF server 510 in the home network. The request 1500 contains a Request Universal Resource Identifier (R-URI) that contains a home network domain name that is derived from the subscriber's IMSI. In FIG. 15, the subscriber's IMSI is 234150999999999. The request 1500 has a "from" field 1510 and a "to" field 1520 that uses a temporary public user identity that is derived form the subscribers IMSI. This temporary public user identity may be the IP Multimedia Public Identity (IMPU), which may comprise a SIP URI such as "sip:234150999999999@msp.mnc015.mcc234.3gppnetwork.org" in FIG. 15. The temporary IMPU may only be used for registering. The HSS 225 may have IMPUs that are associated with the temporary IMPU that are implicitly registered and sent to the application servers (e.g. IP SM gateway 245) and the MSP 235 in a response to the registration request. Other forms of identifiers derived from identification information for the MTC UE 205 may alternatively be used in other examples. The request 1500 further comprises a "contact" field 1530. This field has a header that comprises an instance identifier and a feature tag with the attribute "server" (+g.3gpp.smsmtc="server") that indicates that the MSP 235 is acting as a SMS proxy or SMS gateway for MTC UE 205 devices. The "contact" field 1530 also includes a point of presence representing the MTC UE on whose behalf the MSP 235 is sending the registration request. This may be a reference to an IP address at the MSP 235 allocated for the MTC UE 205.

Following the registration performed by the MSP 235 on behalf of the MTC UE 205, as shown in the examples of the first three phases in FIGS. 3 to 5, the MSP 235 may additionally be used to route messages to (MT) and from (MO) the MTC UE 205 without the need for re-registration.

An exemplary process is shown for a MO SMS message in FIG. 6 and for a MT SMS message in FIG. 7. In particular, the exemplary process of FIG. 6 may be compared with the prior art of FIG. 1.

The process of FIG. 6 begins at step 601 with a mobile originating (MO) SMS message. In this example, the MO SMS message is routed via the MSP 235. In one embodiment, the MTC UE 205 is configured with the IP address of the MSP 235, such that all MO SMS messages are addressed and sent to the MSP 235. In an alternative embodiment, the MSP 235 may be adapted to spoof, i.e. intercept, all MO SMS messages sent on a predefined port, for example this may be port 5060 for SIP depending on the transport protocol used The MTC UE 205 may use SIP as the protocol for sending messages to the MSP 235, although in other embodiments any other protocol may be used between the MTC UE 205 and the MSP 235. At steps 602 and 603, the MSP 235 receives the MO SMS message from the MTC UE 205 and forwards it to the IP SM gateway 245 via any intermediate IM CN elements 620. In the present example, the intermediate IM CN elements 620 may comprise the SIP proxies such as S-CSCF server 240. On receipt of the message, the IP SM gateway 245 may chose the appropriate procedure for delivering the message to the recipient. This may involve transport-level interworking, i.e. conversion of the message format at the transport level, to deliver the message to an SMS Service Centre (SMS-SC), which in turn may deliver the message to a device capable of receiving the message, such as another UE. The IP SM gateway 245 may also forward the message to another device or UE within the IMS, performing any validation and/or translation of the recipient address as required. At steps 604 and 605 the IP SM gateway 245 may send an acknowledgement of receipt to the MSP 235 via any intermediate IM CN elements 620. The MSP 235 may then confirm to the MTC UE 205 at step 606 that the message has been sent.

There are a number of ways to configure MTC UE 205 to route messages to the MSP 235. In one embodiment the MTC UE 205 may be adapted to receive configuration information, such as an IP address or port number for the MSP 235, from the telecommunications system within a control message. For example, a Protocol Configuration Option (PCO) field of a Non Access Stratum (NAS) message may be set to contain the configuration information in an Attach Accept message that is sent to the MTC UE 205 as part of one or more of steps 401 to 403. The MTC UE 205 may be configured to extract the configuration information from this field. Other portions of the NAS message could also be used. Alternatively, a PDN connectivity request accept message, which may be sent from the PDN gateway 230 to the MTC UE 205, may contain the configuration information, wherein the MTC UE 205 may be configured to extract the configuration information from this message. In another embodiment, use may be made of an Open Mobile Alliance Device Management (OMA DM) configuration to configure MTC UE 205. This configuration of the MTC UE 205 may also involve configuring the device to prevent automatic re-registration, as this is now handled by the MSP 235 on behalf of the device.

FIG. 7 illustrates the process of receiving a machine terminating (MT) SMS message that originates from the IP SM gateway 245. A MT SMS message may be sent to the IP SM gateway 245 from, for example, an IMS device or a legacy UE. At steps 701 and 702, the IP SM gateway 245 sends a SIP message containing the MT SMS message data to the MSP 235 via any intermediate IM CN elements 620. The contact details for the MSP 235 are supplied to the IP SM gateway 245 during registration, e.g. the steps of FIG. 5, together with the IMPU of the registered MTC UE 205. This information may be referred to as identification information. Typically, the SIP message indicates that MT SMS message is for the MTC UE 205 through the implicitly registered IMPUs that were registered as a result of registering the temporary IMPU: "sip:234150999999999@msp.mnc015.mcc234.3gppnetwork.org" by the request 1500 of FIG. 15. For example, the temporary IMPU may be associated with other IMPUs that are used to address the SIP message. The MSP 235 receives the SIP message and determines the IP address of the MTC UE 205 associated with the IMPU, i.e. a public contact address used by the IP network is mapped onto a specific contact address for delivery by the MSP 235. The MSP 235 has knowledge of the ISSI of the MTC UE 205 and the IP address for the MTC UE 205 from the notification received in step 407 of FIG. 4. At step 703, the MSP 235 sends an appropriately formatted MT SMS message to the MTC UE 205 using the IP address. The MSP 235 may use SIP to send the MT SMS message to the MTC UE 205 or alternatively any other protocol may be used. If another protocol is used then the MSP 235 may perform any interworking, i.e. format translation, to convert a message for a first protocol received from the IP SM gateway 245, in this case a SIP message, into a message for a second protocol to be sent to the MTC UE 205.

A second embodiment of the present invention will now be described. The system and method of the second embodiment may be used to support an SMS for a variety of UEs, including MTC UEs. For example, a telecommunications or network operator may wish to use more advanced infrastructure, such as that defined in the LTE, for an SMS only. This may be the case for wireless sensor or measurement devices that do not require voice services. An operator may also wish to support a UE not configured for, or not able to, use IMS Centralised Services (ICS) and/or IMS, i.e. a particular set of services associated with a particular telecommunications or network architecture. For example, there may be UE that support each of an LTE-compliant system, an IMS and circuit switched (CS) system; as well as UE that only support CS systems and UE that only support LTE-compliant systems.

A second exemplary network system 800 for use with a second embodiment is shown in FIG. 8. The network system is described with relation to the LTE wireless communication standard for ease of example; however, the present invention is not limited to this standard, such that functionally equivalent network elements from other telecommunications systems may be alternatively used, whether they be wired or wireless. Additionally, a telecommunications or network system may comprise more or fewer elements and more or fewer communication interfaces than those shown in FIG. 8; FIG. 8 may be seen as illustrating the telecommunications or network elements and interfaces that aid explanation of the present embodiment. Certain elements have the same function as their counterparts from the first exemplary network system 200; for example, the second exemplary network system 800 comprises an MTC UE 805, an eNB 810, an MME 815, an HSS 825, one or more SIP proxies represented by an S-CSCF server 840 and an IP SM GW 845. Components of the EPC of FIG. 2 may also be used with the exemplary network system of Figure but are not shown for clarity. The second exemplary network system 800 further comprises additional elements that may form part of an IMS: Mobile Switching Centre (MSC) 835, Terminating Access Domain Selection (T-ADS) server 830 and NodeB or Radio Network Controller (RNC) 820. Instead of NodeB, RNC or eNB, an alternate wired access mechanism may be used in other embodiments. As in FIG. 2, in the present example, the MME 815 and the HSS 825 share the S6a interface. The MME 815 is further communicatively coupled to the MSC 835, for example via the SGs interface as defined in the LTE standard. The NB or RNC 820 offer another means by which the MTC UE 805 may access the telecommunications system communicatively coupled to the IP network, for example a means that may be used for legacy devices or circuit-switched fallback. The NB or RNC 820 are communicatively coupled to the MSC 835. The MSC 835 is communicatively coupled to the HSS 825 via an interface, which in this example is the MAP interface (D) from the 3GPP standards. The HSS 825 may further communicate with the IP SM gateway 845 using the 3GPP MAP J and Diameter Sh interfaces. The MSC 835 incorporates ICS functionality. The MSC 835 is communicatively coupled to one or more SIP proxies. In this example, these include the S-CSCF server 840, coupled via the LTE-defined 12 interface, and may include additional CSCF servers, such as an I-CSCF server (not shown). The S-CSCF server 840 is further communicatively coupled to both the T-ADS server 830 and IP SM gateway 845, in this example via the LTE-defined interface ISC interface. The T-ADS server 840 is a component of a Service Centralization and Continuity Application Server (SCC-AS).

In the second embodiment, the MSC 835, T-ADS server 830 and IP SM gateway 845 may individually or collectively be modified, together with the exemplary interfaces 12 and ISC and the procedures used across these interfaces, to provide an optimised SMS over IP. This modification provides a network subsystem comprising one or more network nodes that allows an UE to be registered for a SMS. In certain embodiments, this registration comprises registering in the IMS for SMS-only functionality. This network subsystem may further enable the use of registered filter criteria, such as those employed by iFC in the LTE standard, for SMS over IP. The modifications to each element will now be described in turn.

In the second embodiment the MSC 835 is modified to register a new communication preference in the form of a feature tag with one or more of S-CSCF server 840, T-ADS server 830 and IP SM gateway 845. For example, the feature tag may comprise "SMS-only", to indicate that the registration, which may be an IMS registration, is being performed with regard to SMS communications only. The MSC 835 may further register an "ICS" feature tag, which includes additional information that the UE is configured to receive SMS, rather than, say, only voice calls. The "ICS" feature tag register the MTC UE 805, or an owner or entity associated with MTC UE 805, for use in ICS including SMS over IP. The MSC 835 may be adapted to register one, or more than one, feature tag(s) against each contact address. The MSC 835 may also be adapted to register multiple contact addresses for a particular UE, each address having a corresponding feature tag e.g. one for ICS and one for SMS-only.

The MSC 835 may also be further modified to act on instructions from one or more other elements of the network subsystem, which may be referred to as the IMS core. For example, a terminating procedure may be selectively invoked by one or more other elements of the network subsystem. This terminating procedure may include the following instructions for the MSC 835:

? "Terminate to ICS contact": wherein on receipt of this instruction the MSC 835 is adapted to interwork, i.e. convert and/or translate, a received message from a protocol format such as SIP to a suitable protocol for delivery to the MTC UE 805. An interworking process as described in LTE SMS standards published by ETSI may be used.

? "Terminate to SMS-only contact": wherein the MSC 835 is adapted to deliver the SMS using the SGs interface, referred to in the art as SMS over SGs (SMSoSGs). The SGs interface is commonly used to page an MTC UE 805 to allow the device to move to another form of wireless access mechanism. It has been adapted for use in sending SMS messages to an MTC UE 805 while maintaining access to an LTE system.

Following the modified communication preferences defined for registration by the MSC 835, the IP SM gateway 845, S-CSCF server 840 and T-ADS server 830 may be adapted to receive a register request. The IP SM gateway 845 is configured to receive registrations from third parties, i.e. from MCS 835 on behalf of MTC UE 805, and to store the registered communication preference together with a contact address for the MTC UE 805. The contact address may be an IMPU or other address. In response to a message for a MTC UE 805, i.e. a machine terminating (MT) SMS message, the IP SM gateway 845 is adapted to extract a contact address from the message and determine if said address is registered. In certain embodiments, the MT SMS is in the form of a SIP message. If the address is registered then the IP SM gateway 845 is further adapted to retrieve the associated communication preference that was registered by the MSC 835. The IP SM gateway 845 is then adapted to process the message according to the communication preference. For example, if a MTC UE 805 has been registered with the feature tags "SMS-only" or "ICS" then the IP SM gateway 845 is adapted to appropriately target, i.e. direct for processing as part of a terminating procedure, a received message to a MTC UE 805 via the SIP proxies, e.g. I-CSCF or S-CSCF servers 840. This, for example, differs from known requests to terminate a message by the IP SM gateway 845 in that in this case the message is targeted to the UE using iFC, whereas known requests may simply terminate a message at a UE without invoking iFC or T-ADS server 830. If there are no registered contacts the IP SM gateway 845 may instruct termination via a CS or Packet Switched (PS) domain.

In the second embodiment, the S-CSCF server 840 may be adapted to invoke specific terminating filtering criteria, e.g. according to iFC, based on presence of the feature tags and methods adapted for the received message format, in this case: SIP messages. The filtering criteria may be configured to send the request to the T-ADS for further processing. The S-CSCF server 840 may be adapted to store a communication preference against a registered contact address, or alternatively may receive the communication preference in communications from other network nodes, such as the IP SM gateway 845.

In the art, the T-ADS server 830 is used to terminate voice communications to a MTC UE 805. This makes it surprising to consider its use in terminating SMS communications. However, by modifying procedures originally designed for voice communications, optimised SMS over IP may be provided without additional and expensive hardware. The T-ADS server 840 is adapted to receive a message routed from the SIP proxies, such as S-CSCF server 840, and determine a suitable procedure for terminating the SMS message at the MTC UE 805 based on the communication preference. In one embodiment, wherein "SMS only" and enhanced "ICS" feature tags are used, the T-ADS server 830 may be adapted to send an SIP message to the contact address referred to in the MT SMS message to the MTC UE 805. The "ICS" feature tags are referred to as "enhanced" as they enhance the services of the ICS beyond voice telephony. The SIP message is then sent to the MTC UE 805 via the MSC 835 and any other intermediate IM CN elements. If the received communication from the S-CSCF server 840 contains both the "ICS" and "SMS-only" feature tags, then a policy defined in the T-ADS decides which termination procedure to use. This policy may make use of SIP Caller Preferences (RFC 3841) that uses "Accept-Contact" and "Reject-Contact" headers to determine which registered contact address, e.g. the contact associated with the "ICS" feature tag or the contact associated with the "SMS-only" feature tag to terminate the message towards.

FIG. 9 illustrates an exemplary registration method using the modified network elements described above. The exemplary registration method is presented with reference to an "SMS only" feature tag; however, the method may also be applied for other feature tags. At step 901, an MTC UE 805 performs a combined attach to the telecommunications system. As explained with reference to FIG. 4, this may comprise accessing a wireless access mechanism. A combined attach refers to the feature that the attachment may be with regard to both an evolved packet core (EPC) for IMS and a circuit switched (CS) domain. Access to the EPC may be via eNB 810 and access to the CS domain via NB or RNC 820. In the present example, the combined attach indicates that it is with regard to "SMS only" services. At step 951, MME 815 processes the combined attach, including the demand for "SMS-only" services. As part of the registration or the configuration of the exemplary network system of FIG. 8, the MSC 835 may be designated for use by the MME 815 as an "SMS-only" MSC, i.e. an MSC capable of processing requests for "SMS only" services and so available for the routing of messages to and from the device that are labelled SMS-only. Hence, at step 902, the MME 815 sends an attach message to MSC 835. This message may comprise an International Mobile Subscriber Identifier (IMSI), which may be used by the MSC 835 to contact the MTC UE 805. At step 903, the MSC 835 registers a contact address of the MTC UE 805, together with an "SMS-only" feature tag towards the IMS core network, i.e. registers on behalf of MTC UE 805 for an SMS. In this example, the registration request is forwarded to the SIP proxies, including S-CSCF server 840. On receipt at the S-CSCF server 840, an iFC evaluation is undertaken at step 904. The iFC evaluation is based on the request type and/or the information contained in the request. In this case, the filtering criteria of the iFC indicate that the registration request is to be forwarded to the IP SM gateway 845 and the T-ADS server 830. This, for example, differs from known requests in that a registration for an SMS is made with the T-ADS server 830. In certain embodiments, the S-CSCF server 840 may store the communication preference, e.g. the feature tag "SMS-only" against a contact address received for the MTC UE 805 as part of the registration. The S-CSCF server 840 may also acknowledge the registration request at step 906, for example using a "200 OK" SIP response. At step 907 the registration request is forwarded to the T-ADS server 830 from the S-CSCF server 840. The T-ADS server 830 then stores the "SMS-only" feature tag against the contact address associated with the registration. At step 909, the T-ADS server 830 may acknowledge receipt of the request to the S-CSCF server 840. At step 910, the S-CSCF server 840 also forwards the registration request to the IP SM gateway 845. The IP SM gateway 845 also stores the "SMS-only" feature tag against the contact address associated with the registration. At step 911, the IP SM gateway 845 may acknowledge receipt of the request to the S-CSCF server 840.

In the example of FIG. 9 registration is performed with respect to each of the SIP proxies, the T-ADS server 830 and IP SM gateway 845. However, in other examples, the registration may be made with one or more than one of these network nodes, wherein information concerning the contact address and associated communication preference may be communicated to the other of the network nodes if required.

Following the exemplary registration method illustrated in FIG. 9, FIGS. 10 and 11 illustrate exemplary termination procedures for "SMS-only" and "ICS" feature tags. These termination procedures may be used to appropriately deliver a machine terminating (MT) SMS message to MTC UE 205.

FIG. 10 illustrates an exemplary termination procedure for devices registered with an "SMS-only" feature tag. The process begins with receipt of an MT SMS message at the IP SM gateway 845. The MT SMS message has a destination address, which in this example is the contact address for the MTC US 205 (for example, the IMPU as described with regard to the first embodiment). Following receipt, the IP SM gateway 845 uses the contact address to retrieve an associated feature tag. In this example, the feature tag is an "SMS-only" feature tag. Following the retrieval of the feature tag, the IP SM gateway 845 looks up the appropriate procedure for terminating the MT SMS message. In the case of the "SMS-only" tag the MT SMS message is to be targeted as a SIP message to the MTC UE 805 via the SIP proxies, including S-CSCF server 840. The IP SM gateway 845 thus constructs a SIP message including, with the possibility of further data, the "SMS-only" feature tag and SMS message data, in this case in the form of Relay Protocol (RP) data. This SIP message is then sent to the S-CSCF server 840 at step 1001.

At step 1002, the S-CSCF server 840 receives the SIP message. It scans the SIP message for the presence of any feature tags. On detection of an "SMS-only" feature tag, the S-CSCF server 840 performs an iFC evaluation, using the content of the feature tag to invoke a specific terminating (e.g. iFC) procedure associated with the particular tag. For example, part of the terminating procedure for the "SMS-only" feature tag may be the sending of the SIP message to the T-ADS server 830. This is illustrated in step 1003. Other feature tags may have different terminating procedures, e.g. procedures that terminate a message at the UE using SIP without involving the T-ADS server 830. If no feature tag is present, or if there are no registered contacts, the IP SM gateway 845 may tunnel the MT SMS message to a PS or CS UE without involvement of the MSC 835. Returning to the present example, after receipt of the SIP message, the T-ADS server 830 analyses the feature tags within the SIP message and selects an appropriate terminating procedure for the remaining delivery of the MT SMS message as describe above. This may also comprise selection of an appropriate MSC 835. In this case, as the feature tag is an "SMS-only" feature tag, at steps 1004 and 1005 a SIP message is forwarded via the SIP proxies to the MSC 835. The MSC 835, following the receipt of the SIP message from the T-ADS 830, then acts to deliver the MT SMS message to the MTC UE 805 according to instructions supplied in or invoked by the SIP message. In FIG. 10 delivery is required for "SMS-only" devices, thus the MSC 835 provides interworking, i.e. processing and transport translation, to deliver the MT SMS message using SMS over SGs, i.e. delivery using the protocol defined by the SGs interface. As shown in FIG. 10, this may comprise: paging an SMS indication at step 1006 and sending a service request at step 1007, these steps being performed across MSC 835, MME 215 and MTC UE 805; extracting the RP data from the SIP message received at the MSC 835 at step 1008 and building an SMS message to send in downlink unitdata, i.e. data to be sent to MTC UE 805; and finally, at step 1009, performing a downlink unitdata transfer and any NAS transport required to deliver the SMS message to the MTC UE 805.

FIG. 11 shows a similar process of message delivery for a MTC UE 805 registered with the enhanced "ICS" feature tag. Steps 1101 to 1105 correspond to steps 1001 to 1005 of FIG. 10. However, in this case the presence of a different feature tag, "ICS", causes a different terminating procedure to be undertaken. For example, the iFC evaluation at step 1102 may result in a different terminating (e.g. iFC) procedure than that selected for "SMS-only" feature tag in step 1002. In the example of FIG. 11, following receipt of instructions for terminating at step 1105, the MSC 835 extracts RP data from the SIP message at step 1106, formulates a suitable SMS message and applies an SMS delivery method, including interworking, compatible with published ETSI Technical Standards 123040 and 124008.

FIGS. 12 and 13 illustrate exemplary methods for delivery of a mobile originating (MO) SMS message sent from MTC UE 805. At step 1201, the MTC UE 805 communicates with MME 815 and MSC 835 to perform an uplink data transfer and appropriate NAS transport. In this case, the unitdata comprises SMS message data. At step 1202, the MSC 835 interworks the unitdata to generate an SIP message with RP data, where the RP data carries the SMS message data. In certain embodiments, the MSC 835 may use the contact address of the MTC UE 805 to determine an appropriate communication preference for the device, which it may insert as a feature tag into the SIP message with the RP data. At step 1203 the SIP message is forwarded to the SIP proxies 840, where an iFC evaluation for a mobile originating message is performed at step 1204. Based on the iFC evaluation the SIP message is appropriately routed to the IP SM gateway at step 1205. On receipt at the IP SM gateway 845 the SIP message is processed at step 1206. This may involve forwarding the SMS message to another UE within the network or forwarding the SMS message to an SMS serving centre (SMS-SC). At steps 1207 and 1208 acknowledgements may be sent to the SIP proxies 840 and the MSC 835. The exemplary method of FIG. 13 is similar to that of FIG. 12, differing in that a different transport method is used at step 1301, requiring different interworking by the MSC 835 at step 1302. Steps 1303 to 1308 are similar to steps 1203 to 1208, with a difference being that a different communication preference is used ("ICS"), which may be inserted into the SIP message to provide different delivery procedures to the IP SM gateway; for example, the outcome of the iFC evaluation may be different for "ICS" identified SIP messages.

Advantages of the second embodiment may be illustrated by considering an exemplary collection of UE. A first set of UE may be adapted to communicate over LTE-compliant systems, an IMS and CS systems. When operating with LTE-compliant systems, MSC 835 can IMS register the UE for SMS-only services, i.e. register a feature tag of "SMS-only". When operating according to second (2G) or third (3G) generation systems that use circuit switching, MSC 835 can IMS register the UE for ICS, i.e. register a feature tag of "ICS". This first set of UE can thus result in the S-CSCF server 840 having two contact addresses for the UE. It is for this reason that the extra use of the T-ADS server 830 is required. For a second set of circuit-switched-only UE, the MSC 835 only IMS registers the UE for ICS, i.e. registers a feature tag of "ICS". For UE that only use LTE-compliant systems, for example, dongles and other forms of MTC UE, the MSC 835 IMS registers the UE for SMS-only services, i.e. registers a feature tag of "SMS-only", when UE attaches. Hence, the exemplary system and methods of the second embodiment allow a wide variety of UE to efficiently use SMS over IP services and further enable an expansion in MTC UE that need to send data using an SMS.

FIG. 14 illustrates an exemplary apparatus 1400 that combines the features of the first and second embodiments. The apparatus may comprise a server with a processor and working memory that implements some or all of the functions of the MSP 235 and MSC 835 described above. The apparatus comprises a number of interfaces that enable it to perform these functions. These include an Sh interface, an SGi interface, an I2 interface, an SGs interface and an interface that implements the mobile radio interface described in ETSI TS 124,008. The apparatus may also include a Mobile Application Part (MAP) interface for sending and receiving SMS data according to the GSM or UMTS network standards. A telecommunications or network operator is thus able to connect the apparatus to the appropriate interface connections within a network to provide optimised SMS over IP for MTC UE.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

Glossary

For ease of reference, the following acronyms are used in the present description:
2G: Second Generation Telecommunications Systems
3G: Third Generation Telecommunications Systems
3GPP: Third Generation Partnership Project
4G: Fourth Generation Telecommunications Systems
CN: Core Network
CS: Circuit Switched
eNB: eNodeB
EPC: Evolved Packet Core
ETSI: European Telecommunications Standards Institute
GPRS: General Packet Radio Service
GSM: Global System for Mobile communications
HSS: Home Subscriber Server
ICS: IMS Centralised Service
I-CSCF: Interrogating Call Session Control Function
iFC: initial Filter Criteria
IMS: IP Multimedia Subsystem
IMSI: International Mobile Subscriber Identifier
IP: Internet Protocol
IMPU: IP Multimedia Public User identity
IP-SM-GW: Internet Protocol Short Message GateWay
ISSI: International Service-provider Subscription Identifier
LTE: Long Term Evolution
MAP: Mobile Application Part
MME: Mobile Management Entity
MO: Mobile Originating MSC: Mobile Switching Centre
MT: Mobile Terminating
MTC: Machine Type Communication
NAS: Non Access Stratum
NB: Node B
OMA DM: Open Mobile Alliance Device Management
PCO: Protocol Configuration Option
PDN: Packet Data Network
P-GW: PDN Gateway
PS: Packet Switched
RNC: Radio Network Controller
RP: Relay Protocol
R-URI: Request Universal Resource Identifier
SCC-AS: Service Centralization and Continuity Application Server
S-CSCF: Serving Call Session Control Function
SGSN: Serving GPRS Support Node
S-GW: Serving Gateway
SIP: Session Initiation Protocol
SM: short message
SMS: short messaging system
SMSoIP: SMS over IP
SMSoSGs: SMS over SGs (SGs is a defined interface in LTE)
SMS-SC: SMS Service Centre
T-ADS: Terminating Access Domain Selection
UE: User-equipment
UMTS: Universal Mobile Telecommunications System
URRP: UE Reachability Request Parameter

The invention claimed is:

1. A method for providing a short messaging service via an internet protocol (IP) network for a device by a proxy server for short message service (SMS) in a wireless communication system, the method comprising:
   transmitting, by the proxy server, first information requesting an attachment notification to a home subscriber server (HSS), the attachment notification indicating that the device has attached to the wireless communication system;
   receiving, by the proxy server, second information including the attachment notification from the HSS when the device has attached to the wireless communication system, the attachment notification comprising identification information for the device; and
   transmitting, by the proxy server, third information including a home network domain name corresponding to the device for registering the device in an internet protocol short message gateway (IP-SM-GW) for using an SMS through an SMS service center (SMS-SC) to a call session control function (CSCF) based on the identification information if the attachment notification is received,
   wherein the proxy server is an entity separated from the SMS-SC and the IP-SM-GW.

2. The method of claim 1,
   wherein the identification information comprises contact information for the device, and
   wherein the method further comprises:
      receiving short message data for delivery to the device; and
      transmitting a short message for delivery to the device based on the contact information received in the attachment notification and the short message data.

3. The method of claim 2, wherein the identification information comprises both a unique identifier for the device and the contact information.

4. The method of claim 3, wherein the unique identifier comprises one of an international mobile subscriber identifier (IMSI) or an international service provider subscription identifier (IS SI).

5. The method of claim 2, wherein the contact information comprises an IP address.

6. The method of claim 2,
   wherein the short message data is configured according to a first network protocol and the short message is configured according to a second network protocol, and
   wherein the method further comprises generating the short message from the short message data, said generating being performed by the proxy server for SMS.

7. A proxy server for short message service (SMS) for providing a short messaging service via an internet protocol (IP) network for a device in a wireless communication system, the proxy server for SMS comprising:
   a transceiver configured to transmit and receive a signal; and
   a controller configured to:
      transmit, to a home subscriber server (HSS), first information requesting an attachment notification, the attachment notification indicating that the device has attached to the wireless communication system,
      receive, from the HSS, second information including the attachment notification when the device has attached to the wireless communication system, the attachment notification comprising identification information for the device, and
      transmit, to a call session control function (CSCF), third information including a home network domain name corresponding to the device for registering the device in an internet protocol short message gateway (IP-SM-GW) for using an SMS through an SMS service center (SMS-SC) based on the identification information if the attachment notification is received,
   wherein the proxy server is an entity separated from the SMS-SC and the IP-SM-GW.

8. The proxy server for SMS of claim 7,
   wherein the identification information comprises contact information for the device, and
   wherein the controller is further configured to:
      receive short message data for delivery to the device; and
      transmit a short message for delivery to the device based on the contact information received in the attachment notification and the short message data.

9. The proxy server for SMS of claim 8, wherein the identification information comprises both a unique identifier for the device and the contact information.

10. The proxy server for SMS of claim 9, wherein the unique identifier comprises one of an international mobile subscriber identifier (IMSI) or an international service provider-subscription identifier (IS SI).

11. The proxy server for SMS of claim 8, wherein the contact information comprises an IP address.

12. The proxy server for SMS of claim 8, wherein the short message data is configured according to a first network protocol and the short message is configured according to a second network protocol, the proxy server for SMS being further arranged to:
   generate the short message from the short message data.

13. The proxy server for SMS of claim 8, wherein the controller is further configured to:
   receive a first message from the device; and
   send a second message to at least one of the one or more network nodes based on receipt of the first message.

14. The proxy server for SMS of claim 13, wherein the second message is a session initiation protocol message.

15. The proxy server for SMS of claim 7, wherein the first information is transmitted to a home subscriber server for receiving the attachment notification from the home subscriber server.

16. The proxy server for SMS of claim 15, wherein the attachment notification is transmitted from the home subscriber server to the proxy server for SMS based on data received by the home subscriber server from a packet data network (PDN) gateway following attachment of the device to the wireless communication system.

17. The proxy server for SMS of claim 7, wherein the controller is further configured to subscribe to user equipment reachability request parameter (URRP) for internet protocol (IP) Sh interface data using diameter protocol.

18. The proxy server for SMS of claim 7,
wherein the wireless communication system comprises one or more network nodes,
wherein the one or more network nodes comprise one or more of:
one or more session initiation protocol servers; or
the IP-SM-GW arranged to send short messages to the device and/or receive short messages from the device, and
wherein the proxy server for SMS is arranged to register with at least the IP-SM-GW.

19. The proxy server for SMS of claim 7, wherein the controller is further configured to:
re-register the device with at least one of the one or more network nodes for communication of the SMS over the IP network based on a specified period.

20. The proxy server for SMS of claim 7, wherein the wireless communication system comprises a radio access network and the device wirelessly accesses the wireless communication system via the radio access network.

* * * * *